(12) United States Patent
Soma et al.

(10) Patent No.: US 6,242,752 B1
(45) Date of Patent: Jun. 5, 2001

(54) PHOTOCATALYST, LIGHT SOURCE AND LIGHTING DEVICE

(75) Inventors: Ryuji Soma, Tokyo; Hisashi Honda, Kanagawa; Ariyoshi Ishizaki, Kanagawa; Tsutomu Watanabe, Kanagawa; Hiroshi Kamata, Kanagawa; Akiko Saitou, Kanagawa; Akimasa Endou, Kanagawa, all of (JP)

(73) Assignees: Toshiba Lighting and Technology Corp.; Nihon Doro Kodan-Japan Highway Public Corp., both of (JP)

( * ) Notice: Subject to any disclaimer, the term of this patent is extended or adjusted under 35 U.S.C. 154(b) by 0 days.

(21) Appl. No.: 09/117,895
(22) PCT Filed: Aug. 13, 1997
(86) PCT No.: PCT/JP97/02828
§ 371 Date: Apr. 16, 1999
§ 102(e) Date: Apr. 16, 1999
(87) PCT Pub. No.: WO98/25700
PCT Pub. Date: Jun. 18, 1998

(30) Foreign Application Priority Data

Dec. 9, 1996 (JP) .................................................. 8-328081

(51) Int. Cl.$^7$ ................................................ B01J 19/12
(52) U.S. Cl. ...................... 250/504 R; 422/121; 422/186
(58) Field of Search .......................... 250/504 R, 503.1, 250/525.1, 493.1; 422/186, 186.3, 121, 122; 204/157.15, 158.2, 158.21; 428/357, 369, 372, 378, 379, 403

(56) References Cited

U.S. PATENT DOCUMENTS

| | | | |
|---|---|---|---|
| 5,608,227 | * | 3/1997 | Dierks et al. ..................... 250/504 R |
| 5,874,701 | * | 2/1999 | Watanabe et al. .............. 204/157.15 |
| 5,919,422 | * | 7/1999 | Yamanaka et al. ................... 422/121 |
| 6,024,929 | * | 2/2000 | Ichikawa et al. .................... 422/186 |
| 6,074,748 | * | 6/2000 | Ogata ............................... 250/504 R |

* cited by examiner

Primary Examiner—Kiet T. Nguyen
(74) Attorney, Agent, or Firm—Morrison Law Firm

(57) ABSTRACT

A translucent cover (9) is so provided as to cover a high pressure sodium lamp (11) adapted to radiate at least visible light and rays of light in the wavelength range of 300 nm to 400 nm. A photocatalytic film (13) which is capable of preventing generation of interference between visible light is formed on either one of or both the inner side and outer side of the translucent cover (9). The photocatalytic film (13) contains as the principal component titania ($TiO_2$) of which the peak wavelength for visible light transmittance is nearly the same as the peak wavelength for visible light radiated from the high pressure sodium lamp (11). Ultraviolet light radiated from the high pressure sodium lamp (11) enhances oxidation and decomposition of substances performed by the photocatalytic film (13), thereby preventing grime and contaminants from adhering to the translucent cover (9). Even if the thickness of the photocatalytic film (13) is increased in order to make the photocatalytic function more effective, visible light radiated from the high pressure sodium lamp (11) effectively passes through the photocatalytic film (13) at the peak wavelength so that decrease in the illuminating efficiency is prevented.

20 Claims, 13 Drawing Sheets

PHOTOCATALYST, LIGHT SOURCE AND LIGHTING DEVICE

TECHNICAL FIELD

The present invention relates to a Photocatalyst having a photocatalytic function, a light source and a lighting device.

BACKGROUND OF THE INVENTION

Generally speaking, a lighting device is often used outdoors, where it tends to become dirty, or indoors with cigarette smoke and odor floating in the air.

Lighting devices used outdoors are especially easy to be contaminated with dirt and debris because of the presence of various atmospheric pollutants, for example those contained in automobile exhaust gas such as $CO_2$ (carbon dioxide), $NO_x$ (nitrogen oxide) and carbon particles, and oil mist exhausted from a diesel engine vehicle due to incomplete combustion.

As such a lighting device is often disposed high above a road surface or at a dark place in a tunnel, costs for cleaning when contaminated with dirt or debris and other maintenance operations are high.

Lighting devices used indoors tend to be contaminated with nicotine and other impurities.

In that case, too, their maintenance is not always easy, and there is a demand for lighting devices which are easier to maintain.

An example of a means for solving this problem by decomposing adhering substances through oxidation is offered in Japanese Patent Laid-open No. 1989-169866, which discloses a fluorescent lamp hermetically containing mercury to be caused to radiate ultraviolet light by means of negative glow discharge in a translucent envelope, wherein a photocatalytic film made of titania ($TiO_2$), which is a substance having the photocatalytic function, is formed on the surface of the envelope.

The lighting device described above is adapted to ionize and excite the mercury by means of negative discharge, thereby causing the mercury to radiate ultraviolet with wavelengths of 185 nm and 245 nm so that the radiated ultraviolet would remove the odor and decompose organic substances in the ambient atmosphere or perform other similar functions.

To explain it in more detail, when light having a wavelength range whose energy exceeds that of the band gap, i.e. the width of the forbidden band, of a semiconductor is radiated, electrons and electron holes are generated in the semiconductor, causing a electron-transfer reaction. For example, titania ($TiO_2$) is a semiconductor having a band gap of approximately 3.0 eV. When so-called ultraviolet light having a wavelength of less than 410 nm contained in the light radiated from a man-made light source such as an incandescent lamp or a high intensity discharge lamp is radiated to titania ($TiO_2$), electrons and electron holes, i. e. escape holes, are formed in the titania ($TiO_2$), and movement of these holes causes an electron transfer reaction on the surface of the semiconductor. As these holes have sufficient oxidation capability, in other words a force sufficient to remove electrons equivalent to the energy of the band gap, substances adhering to or otherwise in contact with the surface of the titania ($TiO_2$) are oxidized and decomposed during the electron-transfer reaction by the oxidation capability of the holes.

As titania ($TiO_2$) has the characteristic of generating a strong oxidation capability when exposed to ultraviolet light, thereby enhancing oxidation and decomposition of substances adhering to the surface of the titania ($TiO_2$), such as acetaldehyde, methyl mercaptan, hydrogen sulfide or ammonia, it facilitates cleaning of dirt or debris adhering to the lamp due to atmospheric pollution or other causes. It should be noted that titania ($TiO_2$) may in some occasions perform the photocatalytic function under visible light having wavelengths of more than 410 nm, because the band gap of the titania ($TiO_2$) is variable to some extent depending on the density of an impurity.

An example of a lighting device which uses a lamp for general illumination and has a photocatalytic function is offered in Japanese Patent Laid-open No. 1995-111104, which discloses a structure that calls for forming a photocatalytic film on the inner surface of a translucent cover facing the lamp, and producing a photocatalytic action by use of ultraviolet radiated from the lamp, thereby deodorizing and disinfecting the air introduced into the translucent cover.

Although a photocatalytic film is formed on the inner surface of the translucent cover, its purpose lies in deodorization. Therefore, the structure described in Japanese Patent Laid-open No. 1995-111104 remains unproved as to whether it has sufficient cleaning capability.

It is known to those skilled in the art that the activity of a photocatalytic film increases in virtually direct proportion to the thickness of the film if the light radiated to the photocatalytic film remains constant.

Therefore, in cases where a photocatalytic film is formed on the translucent cover of a lighting device in order to prevent it from becoming dirty in an ambience, such as outdoors, which contains a great quantity of dirt and pollutants, the photocatalytic film has to be considerably thick.

It has been found, however, that merely increasing the thickness of the photocatalytic film does not always enhance the decomposition of grime. It has also been confirmed through experiments that the transmittance of visible light in a certain wavelength range decreases due to the interference and action of the photocatalytic film. Therefore, if a photocatalytic film is used together with a light source of which the maximum peak wavelength of the optical output corresponds to a wavelength where the transmittance of the photocatalytic film is low, it may result in a decrease in the illuminating efficiency caused by the reduced illumination intensity or inadequate light distribution.

In cases where a titanium oxide is used as a photocatalytic film, it is a common practice to form the photocatalytic film by using titanium alkoxide. Although a photocatalytic film thus formed has a high transmittance, it sometimes presents an insufficiently low photocatalytic capability. The decrease in the photocatalytic capability is caused by a decrease in the quantity of the anatase-type titanium oxide, which has a highly effective photocatalytic capability, contained in the photocatalytic film. For this reason, it is necessary to make the photocatalytic film thicker even at the cost of reducing the transmittance to some extent.

However, as the refractive index of titanium oxide is relatively high, a thick photocatalytic film often causes interference between visible light which will produce a rainbow-color interference pattern.

A measurement of the photo-absorption spectrum indicates that a lighting device offered in the aforementioned Japanese Patent Laid-open No. 1995-111104, too, has such drawbacks as a low transmittance of visible light, which results in a reduced efficiency, as well as appearance of photo-interference peak waveforms.

Such interference colors as mentioned above are undesirable, because they have an unfavorable influence on objects targeted for radiation and also impair the appearance of the lighting device itself.

In order to solve the above problems, an object of the present invention is to provide a lighting device of which decrease in the illuminating efficiency is limited, maintenance is easy, and generation of interference colors is prevented without the danger of decrease in its photocatalytic effect or transmittance of visible rays.

DISCLOSURE OF THE INVENTION

A photocatalyst according to the present invention includes a base member adapted to transmit at least rays of light having wavelengths of not more than 410 nm, and a photocatalytic film formed on at least a part of the base member, the photocatalytic film so formed as to not generate interference between visible light and be capable of transmitting light such that the transmittance of visible light at a wavelength of 550 nm is at least 15% higher than the transmittance of ultraviolet light having a wavelength of 365 nm. As the base member is capable of transmitting light having wavelengths of not more than 410 nm, and the transmittance of the photocatalytic film of visible light at a wavelength of 550 nm is at least 15% higher than its transmittance of 365 nm ultraviolet light, the photocatalyst is capable of transmitting visible light to a sufficient extent. In addition, as there is no interference between visible light, the photocatalyst does not produce rainbow colors and reliably performs the photocatalytic function, thereby promoting oxidation and decomposition of substances on the photocatalytic film. Thus, the photocatalyst according to the invention is capable of preventing the base member from becoming dirty and facilitating its maintenance.

According to another feature of the invention, a photocatalytic film without a base member has a visible light transmittance at a wavelength of 550 nm of not less than 83% and an ultraviolet transmittance of not more than 68%. As long as a photocatalytic film itself, i. e. a film without a base member, has a visible light transmittance at a wavelength of 550 nm of 83% or more, a sufficient quantity of visible light can be obtained. Further, ultraviolet transmittance being not more than 68% ensures a sufficiently effective photocatalytic function.

According to yet another feature of the invention, the photocatalytic film has a thickness ranging from 0.01 $\mu$m to 0.3 $\mu$m. In cases where the photocatalytic film is less than 0.01 $\mu$m in thickness, it not only makes it difficult to form a uniform film but also so drastically reduce the light absorption capability of the photocatalytic film to impair the photocatalytic activity. On the other hand, in cases where the photocatalytic film is more than 0.3 $\mu$m in thickness, the film is more prone to the problem of rainbow interference colors caused by interference between visible light.

According to yet another feature of the invention, the photocatalytic film contains as the principal component an anatase-type titanium oxide. An anatase-type titanium oxide has a highly effective photocatalytic capability and enables the formation of a colorless, transparent film.

According to yet another feature of the invention, the base member is formed of glass. As glass blocks ultraviolet rays having wavelengths of not more than 254 nm to a considerable extent, it is suitable for a fluorescent lamp. In addition, as glass is inexpensive and easy to process, using glass as the base member has the additional benefit of expanding the applicable range of the photocatalyst.

According to yet another feature of the invention, the glass is in the shape of plate which transmits visible light, with a photocatalytic film formed on at least one side of the glass. As a photocatalytic film is formed on at least one side of a glass plate that is capable of transmitting visible light, the invention offers a simple configuration and thereby expands the range of usage.

Furthermore, a light source according to the present invention includes an airtight container formed of a translucent material that transmits at least rays of light having wavelengths of not more than 410 nm; a photocatalytic film which is so formed on at least a part of the outer surface of the airtight container as to not generate interference between visible light and be capable of transmitting light such that the transmittance of the photocatalytic film of visible light at a wavelength of 550 nm being at least 15% higher than the transmittance of ultraviolet light having a wavelength of 365 nm; and a light emission means disposed in the airtight container. As the airtight container is formed of a translucent material that transmits at least rays of light having wavelengths of not more than 410 nm so that the light from the light emission means is transmitted through the photocatalytic film, a sufficiently effective photocatalytic capability is ensured to enhance oxidation and decomposition of substances attached to the photocatalytic film. Thus, the invention is effective in preventing the airtight container from becoming dirty and facilitating its maintenance. In addition, as the transmittance of the photocatalytic film of visible light at a wavelength of 550 nm is at least 15% higher than the transmittance of ultraviolet light having a wavelength of 365 nm, a sufficient quantity of visible light is ensured to pass through the photocatalytic film.

Furthermore, a lighting device according to the present invention includes a main body which incorporates a light source and a radiation opening, said light source adapted to emit at least rays of light having wavelengths of not more than 410 nm; a base member disposed at the radiation opening of the main body of the device and adapted to transmit visible light as well as rays of light having wavelengths of not more than 410 nm; and a photocatalytic film which is so formed on either a part of or the entire surface of at least a surface of the base member as to not generate interference between visible light and be capable of transmitting light such that the transmittance of the photocatalytic film of visible light at a wavelength of 550 nm is at least 15% higher than the transmittance of ultraviolet light having a wavelength of 365 nm. As the base member transmits visible light and rays of light having wavelengths of not more than 410 nm, and a photocatalytic film is so formed as to not generate interference between visible light and be capable of transmitting light such that the transmittance of visible light at a wavelength of 550 nm is at least 15% higher than the transmittance of ultraviolet light having a wavelength of 365 nm, the invention ensures sufficient visible light as well as a sufficiently effective photocatalytic function while preventing generation of rainbow colors which may otherwise be caused by visible light.

According to yet another feature of the invention, the base member is a translucent cover, and there is no need of a separate base member for forming a photocatalytic film.

According to yet another feature of the invention, the base member is a transparent globe, and there is no need of a separate base member for forming a photocatalytic film.

Furthermore, a lighting device according to the present invention includes a translucent cover covering a light source adapted to radiate at least visible light and rays of light in the wavelength range of 300 nm to 400 nm, and a photocatalytic film is formed on at least one side of the translucent cover and contains as the principal component titania ($TiO_2$) of which the peak wavelength for visible light transmittance is nearly the same as the peak wavelength for visible light radiated from the light source. With the configuration as above, the photocatalytic film formed on the translucent cover enhances oxidation and decomposition of substances attached to the photocatalytic film, consequently preventing grime and stains from adhering to the translucent cover and facilitating maintenance of the translucent cover. In addition, even if the thickness of the photocatalytic film is increased in order to make the photocatalytic function more effective, the photocatalytic film effectively transmits visible light at the peak wavelength radiated from the light source, because the peak wavelength thereof is nearly the same as the peak wavelength for visible light radiated from the light source. Thus, the invention ensures sufficient illuminance, as well as optimizing the distribution of luminous intensity and limiting the decrease in illuminating efficiency.

According to yet another feature of the invention, the peak wavelength for visible light transmittance of the photocatalytic film ranges from 500 nm to 600 nm. With this feature, the invention is applicable to various light sources that have the peak wavelength for visible light in the range of 500 nm to 600 nm.

According to yet another feature of the invention, the translucent cover transmits not less than 80% of light that includes visible light and ultraviolet light in the wavelength range of 300 nm to 400 nm.

According to yet another feature of the invention, the principal component of the photocatalytic film is anatase crystal-type titania ($TiO_2$). Anatase crystal-type titania has a highly effective photocatalytic function and enables the formation of a colorless, transparent film.

According to yet another feature of the invention, the photocatalytic film is formed with an intermediate layer principally comprised of silica ($SiO_2$) provided between the photocatalytic film and the translucent cover. By forming the photocatalytic film with an intermediate layer which is principally comprised of silica ($SiO_2$) and provided between the photocatalytic film and the translucent cover, the invention offers a simple structure that is capable of supporting a photocatalytic film without having an unfavorable influence on the translucent cover.

According to yet another feature of the invention, the photocatalytic film has a thickness ranging from 0.01 $\mu$m to 0.5 $\mu$m. A photocatalytic film less than 0.01 $\mu$m in thickness not only suffers from a drastic decrease in its capability of light absorption but is also difficult to be made uniform and therefore suffers from decrease in the degree of photocatalytic activity, while a photocatalytic film more than 0.5 $\mu$m in thickness excessively reduces transmittance of visible light and results in decrease in the irradiation efficiency.

Furthermore, according to yet another feature of the invention, the light source is a high pressure sodium lamp. As the peak wavelength for visible light emitted from the high pressure sodium lamp is 580 nm, the illuminating efficiency can be increased.

A lighting device according to yet another feature of the invention includes a main body incorporating a light source adapted to emit ultraviolet light in the wavelength range of 300 nm to 410 nm at not less than 0.05 W per 1000 lm of visible light; a translucent cover disposed in the main body in such a state as to cover the light source, said translucent cover having transmittance not less than 80% for at least a part of ultraviolet light in the wavelength range of 300 nm to 410 nm; and photocatalytic films which contain titanium oxide as the main component and formed on both sides of the translucent cover. Therefore, by means of the photocatalytic films which are formed on both sides of the translucent cover and enhance oxidation and decomposition of substances attached to the photocatalytic films on the outer and inner sides of the translucent cover, the invention is capable of preventing the translucent cover from becoming dirty and facilitating its maintenance. In addition, by using a light source adapted to emit ultraviolet light in the wavelength range of 300 nm to 410 nm at not less than 0.05 W per 1000 lm of visible light, the invention also ensures the reliable photocatalytic function.

According to yet another feature of the invention, the titanium oxide contained in the photocatalytic films is of an anatase type, and the photocatalytic films are made nearly uniform in thickness. As the titanium oxide is of an anatase type, colorless, transparent films having a highly effective photocatalytic capability can be formed. As the films are made nearly uniform in thickness, the films perform a uniform photocatalytic function over the entire surface thereof.

According to yet another feature of the invention, ultraviolet light radiated to the inner surface of the translucent cover and having wavelengths ranging from 300 nm to 410 nm has an intensity of 0.05 $mW/cm^2$ in terms of illuminance. Therefore, as ultraviolet light with a sufficient intensity is radiated to the photocatalytic films, a reliable photocatalytic activity is ensured.

BEST MODE FOR CARRYING OUT THE INVENTION

Figure 1:
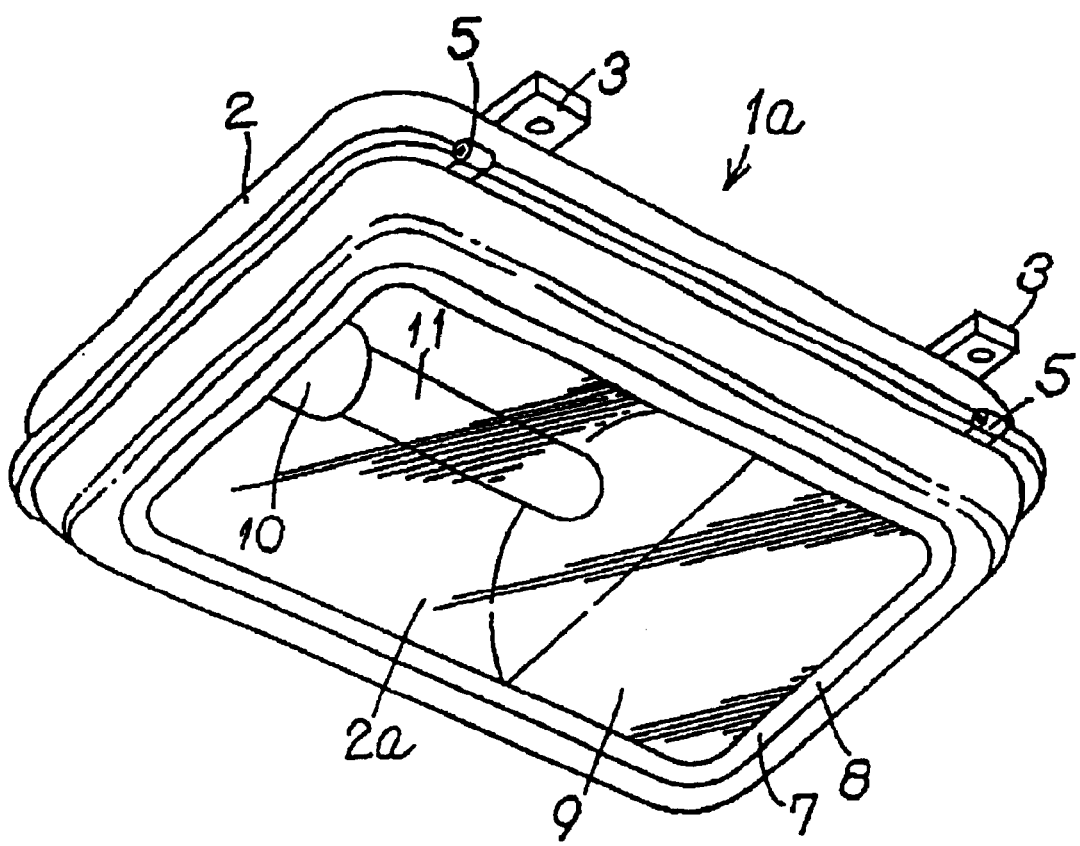
FIG. 1 is a perspective of a lighting device to be used in a tunnel according to an embodiment of the present invention.

Next, a lighting device according to an embodiment of the present invention is explained hereunder, referring to the drawings.

Figure 2:
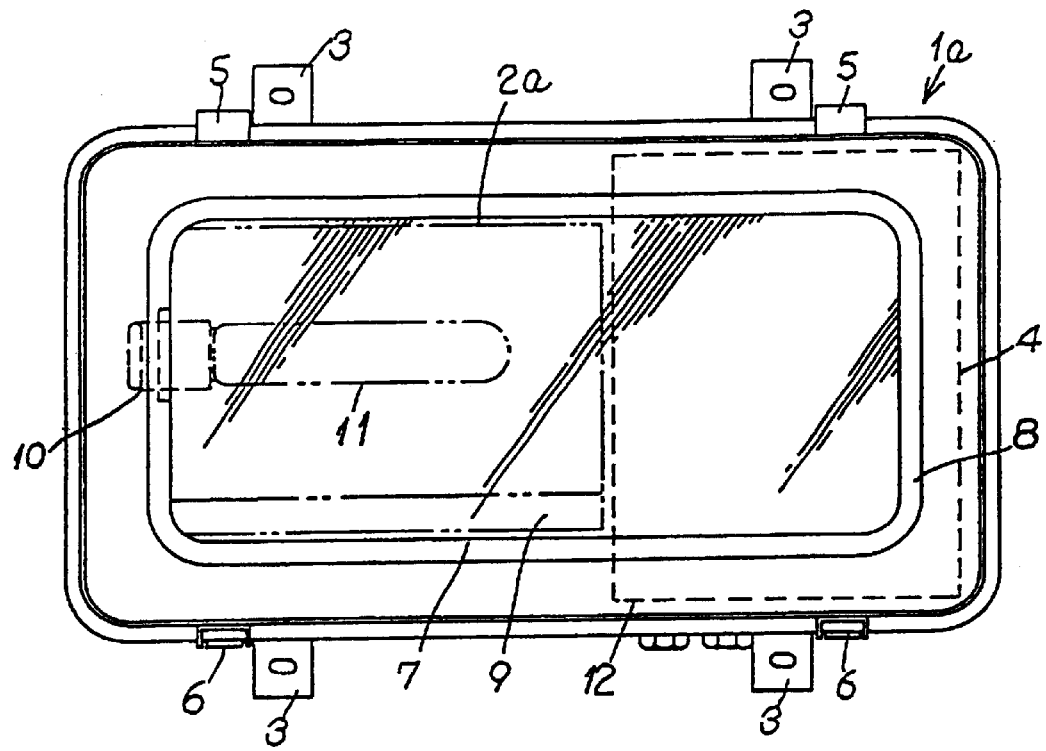
FIG. 2 is a front view of same.
Figure 3:
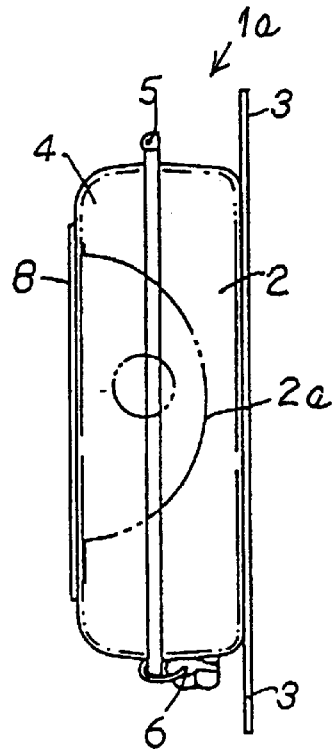
FIG. 3 is a side view of same.

Referring to FIGS. 1 through 3 that illustrate the first embodiment, numeral 1a denotes a lighting device which may be installed in a tunnel. The lighting device 1a is corrosion resistant and includes a main body 2 which is a thin, hollow box made of stainless steel and open at the front end. A surface-mount fitting for affixing the lighting device to a wall or other surface on which the lighting device may be mounted is attached the back face of the main body 2. An open/close cover body 4 which is made of stainless steel like the main body 2, is attached with hinges to the front opening of the main body 2. Latches 6 are provided at the underside of the main body 2 so that the cover body 4 may close the main body 2 in a fluid-tight state.

The cover body 4 has at its center a radiation opening 7, in which a translucent cover 9 is fitted in a fluid-tight state by means of a corrosion resistant silicone rubber packing. The translucent cover 9 is a flat plate formed of a material which may be a tempered glass or a synthetic resin and permits transmission of the visible rays as well as at least 80% of the entire or a part of the ultraviolet rays within the wavelength range of 300 nm to 400 nm.

Figure 5:
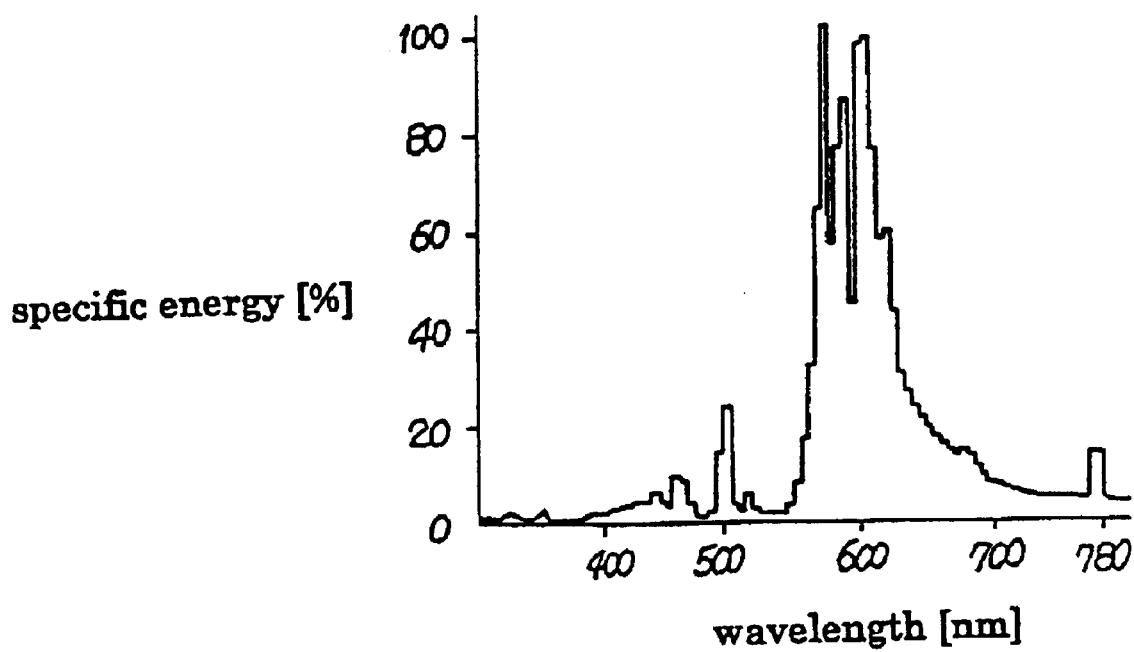
FIG. 5 is a characteristic diagram showing the emission spectrum distribution of a high pressure sodium lamp according to said embodiment.

Attached to the main body 2 is a lamp socket 10, to which a single-cap type high pressure sodium lamp 11 serving as the light source that radiates ultraviolet rays within the wavelength range of 300 nm to 400 nm at an intensity of not less than 0.05 W per 1000 lm is removably attached, at a position facing the translucent cover 9 of the cover body 4. As shown in FIG. 5, the high pressure sodium lamp 11 is adapted to radiate light which includes visible rays and ultraviolet rays in the wavelength range from 300 nm to 400 nm, for example ultraviolet rays having peak wavelengths at 330 nm and 365 nm. The peak wavelengths of the visible rays is at 580 nm.

A ballast box 12 which houses a ballast for actuating the high pressure sodium lamp 11 is attached to the main body 2. A reflector 2a having a curved surface is disposed in the main body 2, at a position optically opposite the high pressure sodium lamp so that rays radiated from the high pressure sodium lamp 11 may be reflected towards the radiation opening 7.

Figure 4:
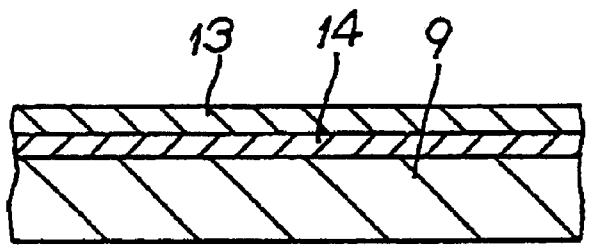
FIG. 4 is an enlarged sectional view of a part of a translucent cover used in the lighting device for a tunnel according to said embodiment.

As shown in FIG. 4, a photocatalytic film 13 is formed on the outer surface of the translucent cover 9 in such a manner as to permit visible rays to pass through the film. The photocatalytic film 13 is produced by forming an intermediate layer principally comprised of silica ($SiO_2$) on the outer surface of the translucent cover 9 and then forming another layer on the intermediate layer 14, the outer layer principally comprised of titania ($TiO_2$) of an anatase crystal type.

The intermediate layer 14 contains fine particles of silica having a particle diameter ranging from 60 nm to 200 nm and has a thickness ranging from 0.5 $\mu$m to 2 $\mu$m. The intermediate layer 14 is formed by dipping a base member in solution produced from hexamethyl-disilazane ($Me_3SiNHSiMe_3$) and hexamethyl-cyclotrisilazane ($[Me_2SiNH]_3$), which may be a product of Tonen Corp., pulling it out to dry and then baking the material at 80° C. The intermediate layer 14 permits transmission of visible light as well as at least 80% of the entire or a part of ultraviolet rays having wavelengths in the range of 300 nm to 400 nm. The intermediate layer 14 is not always necessary, if its absence does not have an unfavorable influence on the optical characteristics or the photocatalytic function of the device.

The production of the photocatalytic film 13 calls for preparing a titanium alcoholate solution by dissolving a material principally comprised of an organic titanium compound in a solvent, such as alcohol, and baking a base member after dipping it in the solution. The photocatalytic film 13 is formed to have a thickness ranging from 0.01 $\mu$m to 0.5 $\mu$m so as to permit 80% or more of at least a part of visible light having wavelengths in the range of 380 nm to 760 nm.

Figure 6:
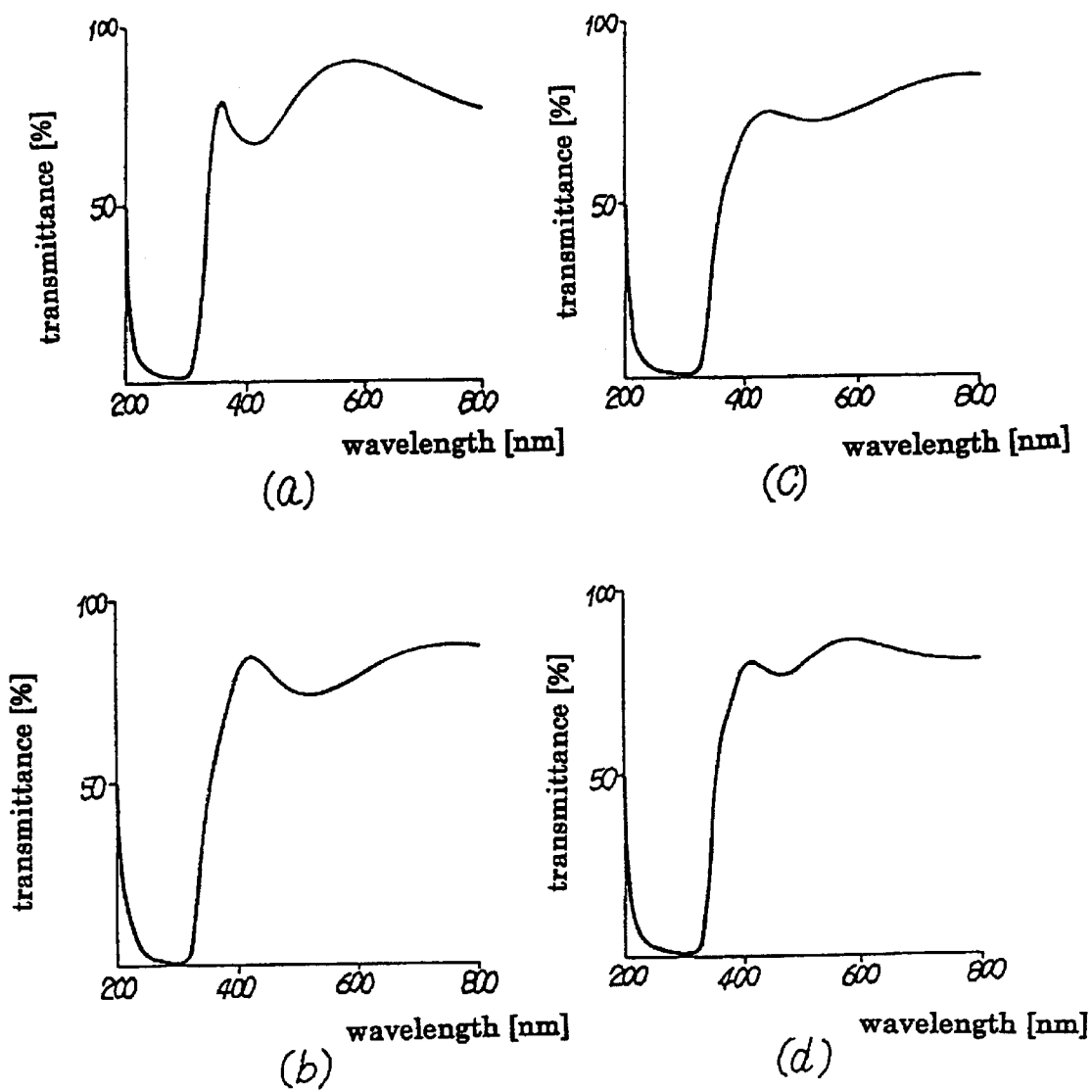
FIG. 6 shows characteristic diagrams of the spectral transmission factors of a photocatalytic film according to said embodiment, (a) through (d) respectively representing spectral transmission factors of samples of photocatalytic films containing different components and/or additives.

As shown in FIG. 6(a), the peak wavelength of the transmittance of the photocatalytic film 13 is influenced by a slight interference between light. In other words, the photocatalytic film 13 is formed as an interference film having its transmittance peak wavelength at 590 nm, which is close to the peak wavelength, i.e. 580 nm, of the visible rays radiated from the high pressure sodium lamp 11. The peak wavelength of the photocatalytic film 13 has to be in the half-value range of the peak wavelength for visible rays from the light source, which is the high pressure sodium lamp 11 in case of the present embodiment. As shown in FIG. 6(b) through (d), the peak transmission wavelength of the visible rays can be changed, within the range from 500 nm to 600 nm, by changing the components, additives or the refractive index of the film. Furthermore, the curve shown in each diagram can respectively be shifted along the horizontal axis by changing the thickness of the photocatalytic film 13 of the sample.

Next, the function of the first embodiment is described hereunder.

By lighting the high pressure sodium lamp 11 of a lighting device 1a installed in a tunnel, light including visible rays whose peak wavelength is at 580 nm and ultraviolet rays in the wavelength range between 300 nm and 400 nm are radiated from the high pressure sodium lamp 11.

The light from the high pressure sodium lamp 11 reaches the translucent cover 9 either directly or being reflected by the reflector 2a. The light then passes through the translucent cover 9 and the photocatalytic film 13 and is radiated to the interior of the tunnel. At that time, the interior of the tunnel is illuminated with sufficient illuminance, because the parts such as the translucent cover 9, the photocatalytic film 13, the intermediate layer 14 and the like are all capable of allowing the passage of not less than 80% of visible rays.

As the photocatalytic film 13 is formed as an interference film having a transmittance peak wavelength nearly identical to the peak wavelength for visible rays radiated from the high pressure sodium lamp 11, the peak wavelength for visible rays radiated from the high pressure sodium lamp 11 effectively passes through the photocatalytic film 13, thereby ensuring sufficient illuminance.

Due to the influence of dirt and automobile exhaust gas, dirt and other substances, such as carbon, oil mist, acetaldehyde, methyl mercaptan, hydrogen sulfide and ammonia, tend to adhere to the outer surface of the translucent cover 9 of the lighting device 1a installed in a tunnel. However, as the photocatalytic film 13 is formed on the outer surface of the translucent cover 9, the photocatalytic function the photocatalytic film 13 reduces grime accumulated on the outer surface of the translucent cover 9.

To be more specific, when ultraviolet rays in the wavelengths range from 300 nm to 400 nm are radiated from the high pressure sodium lamp 11 to the photocatalytic film 13, holes are formed in the fine particles of titania. As these holes have a sufficient oxidation capability, in other words a force sufficient to remove electrons equivalent to the energy of the band gap of approximately 3.0 eV, substances adhering to or in contact with the surface of the photocatalytic film 13 are transformed by means of the oxidation capability of the holes.

Thus, the embodiment described above has a benefit of making the photocatalytic film 13 hard to dirty and easy to remove contaminant should it become attached to the film, and, therefore, is capable of limiting a decrease in the light transmission factor of the translucent cover 9, which may otherwise be caused by the contamination.

Therefore, even if such substances as mentioned above accumulate on the outer surface of the translucent cover 9, they are effectively prevented from adhering to the translucent cover 9. Thus, the invention is effective in energy saving by preventing a decrease in quality of light beams radiated through the translucent cover 9, and has a benefit of facilitating the maintenance of the device, because it is not necessary to frequently conduct a cleaning operation, such as wiping the translucent cover 9.

As the photocatalytic films 13a, 13b are formed as interference films whose transmittance peak wavelength for visible rays is nearly identical to the peak wavelength for visible rays radiated from the high pressure sodium lamp 11, visible rays radiated from the high pressure sodium lamp 11 effectively passe at the peak wavelength through the photocatalytic films 13a, 13b, thereby ensuring sufficient illuminance. In other words, even if the photocatalytic films 13a,13b are made thicker in order to increase the effectiveness of their photocatalytic function, decrease in the peak wavelength transmittance of visible rays radiated from the high pressure sodium lamp 11 is minimal. Therefore, the invention ensures sufficient illuminance, optimizes the distribution of luminous intensity and limits the decrease in illuminating efficiency.

Furthermore, a photocatalytic layer may be formed on the sides of the main body 2 and the cover 4 as well as on the surface of the reflector 2a so that they do not require frequent cleaning. Thus, in the same manner as the translucent cover 9, the maintenance of these parts can be facilitated.

In cases where the lighting device 1a is installed near the entrance or the exit of a tunnel, at a point where sunlight reaches, or outdoors where the device will be exposed to sunlight, the photocatalytic function of the photocatalytic film 13 may be enhanced by ultraviolet rays in the sunlight.

Figure 7:
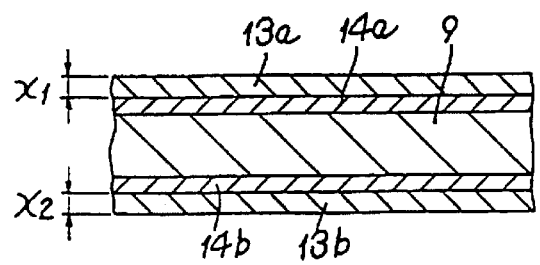
FIG. 7 is an enlarged sectional view of a part of another embodiment of the translucent cover used in a lighting device for a tunnel.

Although a photocatalytic film 13 and an intermediate layer 14 are formed only on the outer surface of the translucent cover 9 in the embodiment described above, photocatalytic films 13a,13b and intermediate layers 14a, 14b may be formed on the inner and outer surfaces of the translucent cover 9 as shown in FIG. 7.

In that case, the thickness X1 of the photocatalytic film 13a on the inner surface of the translucent cover 9 and the thickness X2 of the photocatalytic film 13b on the outer surface are within the range from 0.01 µm to 0.5 µm, the thickness X1 of the photocatalytic film 13a on the inner surface being thinner than the thickness X2, i.e. X1<X2. The intermediate layers 14a,14b are so formed as to have nearly the same thickness.

In cases where the intensity of light radiated to the photocatalytic films 13a,13b is constant, the thicker the films, the more active their photocatalytic function. At the same time, however, the illuminating efficiency decreases, because absorption of the visible rays increases along with the increase in the thickness of the films. In cases where the thicknesses of the photocatalytic films 13a,13b are constant, the more intense the light, the more active the photocatalytic function, while the less intense light makes the photocatalytic function less active. Therefore, even if the photocatalytic film 13a on the inner surface of the translucent cover 9 is thin, the invention ensures a sufficient photocatalytic function as well as superior light transmittance with absorption of the light emitted from the high pressure sodium lamp 11 maintained minimal. In addition, because the photocatalytic film 13b on the outer surface of the translucent cover 9 is sufficiently thick, a sufficiently effective photocatalytic function is ensured even if a part of the light from the high pressure sodium lamp 11 is absorbed by the translucent cover 9 and the photocatalytic film 13a on its inner surface.

Due to exhaust gas entering inside the lighting device as well as gas or saprolegnia generated from a plastic material or rubber in the device, the inner surface of the translucent cover 9, too, may become contaminated with substances mentioned above. However, as the photocatalytic film 13b is formed on the inner surface of the translucent cover 9, the photocatalytic function of the photocatalytic film 13b alleviates the contamination on the inner surface of the translucent cover 9.

In cases where the intensity of light radiated to the photocatalytic films 13a, 13b is constant, the thicker the films, the more active their photocatalytic function. At the same time, however, the illuminating efficiency decreases, because more visible rays are absorbed along with the increase in the thickness of the films. In cases where the thicknesses of the photocatalytic films 13a,13b are constant, the more intense the light, the more active the photocatalytic function, while the less intense light makes the photocatalytic function less active. By using this characteristic of the photocatalytic films 13a,13b, the structure of the embodiment calls for making the photocatalytic film 13a on the inner surface of the translucent cover 9 thin while making the photocatalytic film 13b on the outer surface thick. Therefore, even if the photocatalytic film 13a on the inner surface of the translucent cover 9 is thin, a sufficient photocatalytic function is ensured. The above configuration also ensures superior light transmittance, because only a small amount of light emitted from the high pressure sodium lamp 11 is absorbed. Further, because the photocatalytic film 13b on the outer surface of the translucent cover 9 is thick, a sufficiently effective photocatalytic function is ensured even if a part of the light from the high pressure sodium lamp 11 is absorbed by the translucent cover 9 and the photocatalytic film 13a on its inner surface. Thus, the configuration explained above is thus also capable of improving the photocatalytic function of the photocatalytic film 13b on the outer surface of the translucent cover 9 which otherwise tends to become dirty.

Figure 8:
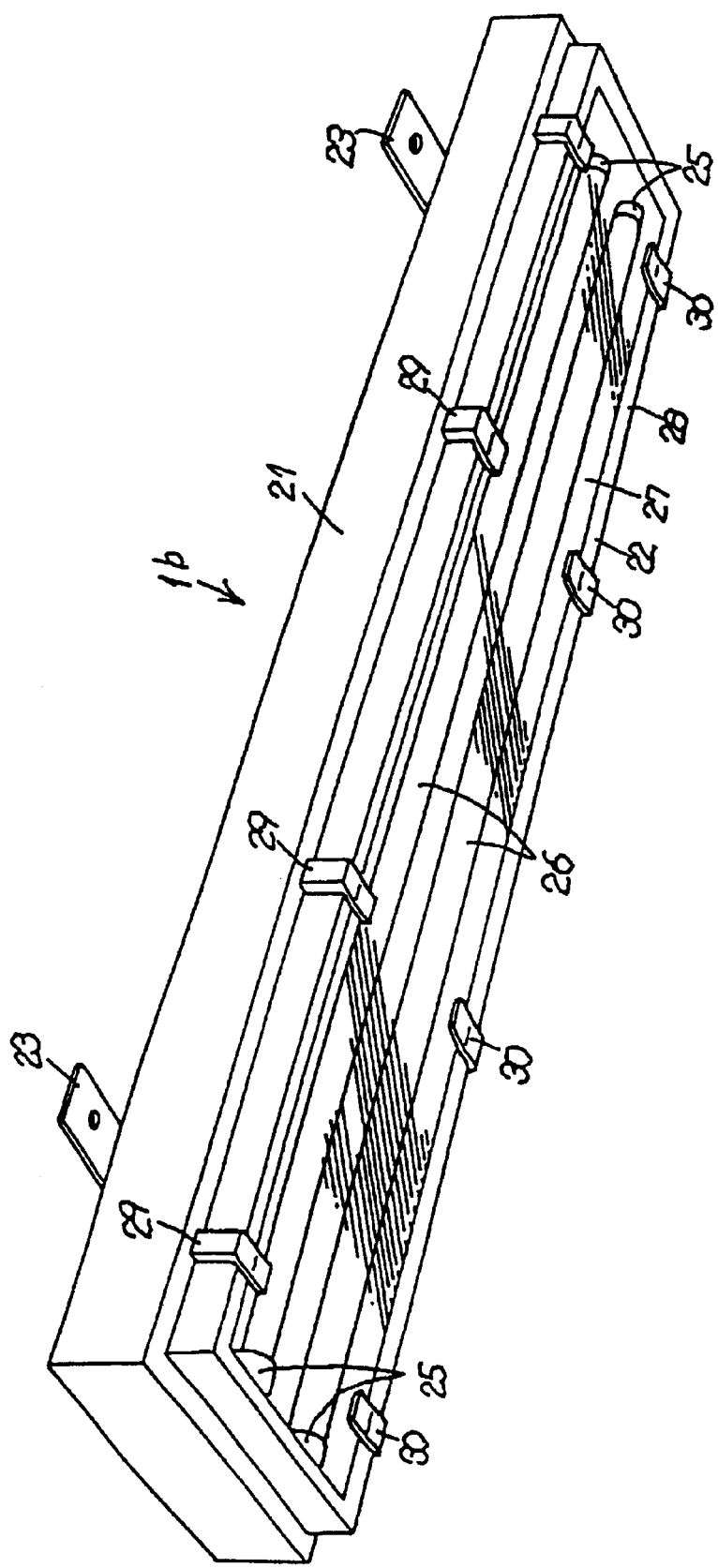
FIG. 8 is a perspective of a lighting device to be used at an emergency parking area according to a second embodiment of the invention.
Figure 9:
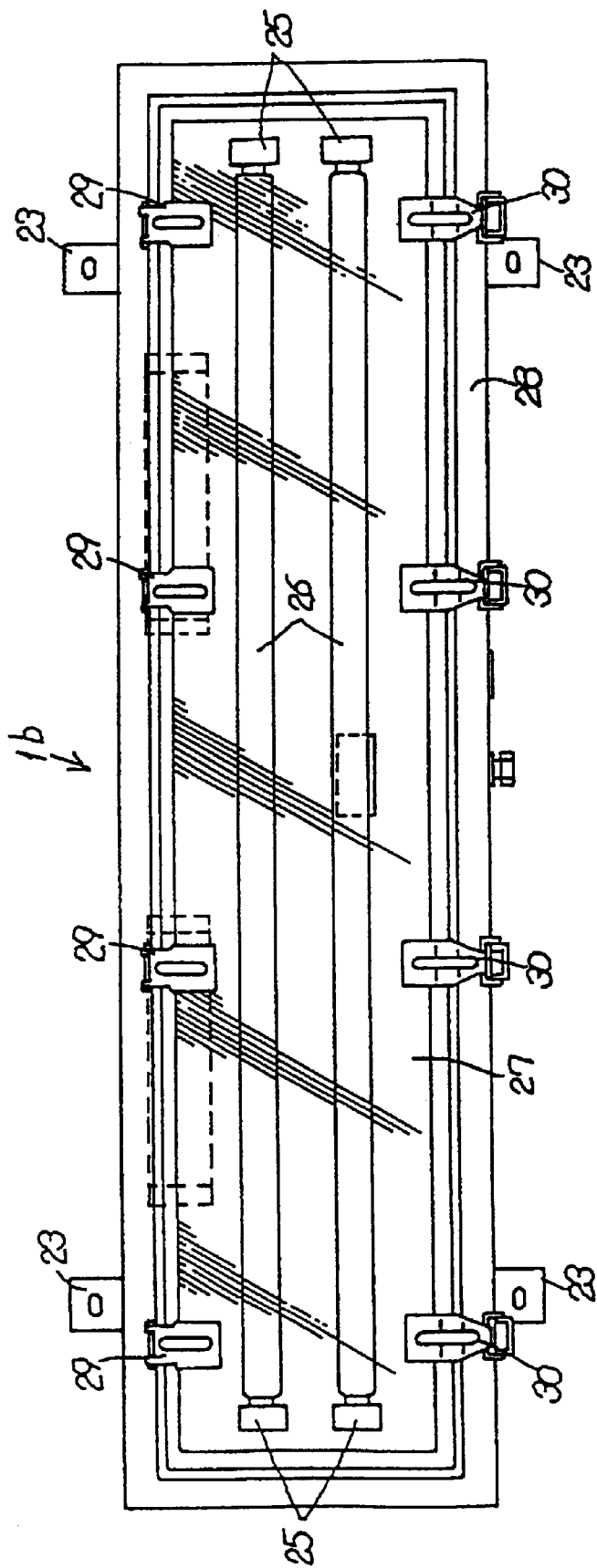
FIG. 9 is a bottom view of said embodiment.
Figure 10:
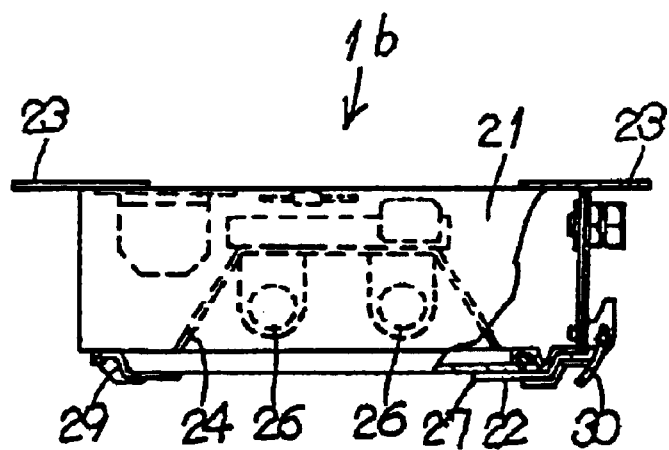
FIG. 10 is a partially cutout side view of the lighting device for an emergency parking area according to said embodiment.

Next, the second embodiment of the invention is explained hereunder, referring to FIGS. 8 through 10.

Referring to FIGS. 8 and 9, a lighting device 1b may be disposed at an emergency parking area in a tunnel. The lighting device 1b includes a hollow main body 21 formed in an elongated rectangular shape and having an opening 22 at the underside. Adapter plates 23 in the shape of tabs are formed on the back of the main body 21.

Attached to the interior of the main body 21 are a plate-shaped reflector 24, which faces the opening 22 in order to reflect radiated light towards the opening 22, and two pairs of lamp sockets 25, each pair consisting of two sockets opposingly disposed at each respective longitudinal end of the reflector 24 and aligned with the corresponding socket of the other pair. A straight-tube type fluorescent lamp 26 serving as a light source is removably disposed between each pair of lamp sockets 25.

Figure 11:
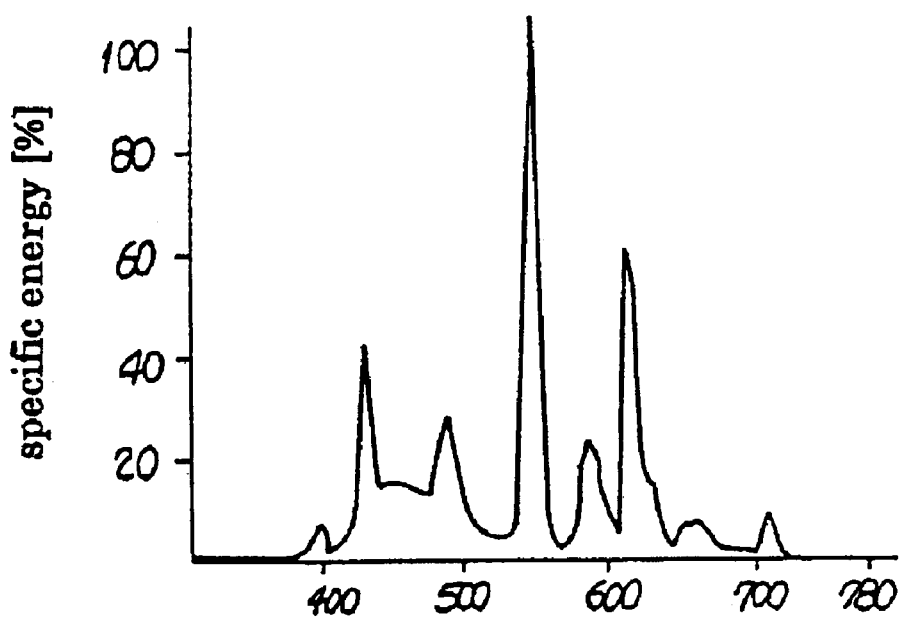
FIG. 11 is a characteristic diagram showing the emission spectrum distribution of a fluorescent lamp according to said embodiment.
Figure 12:
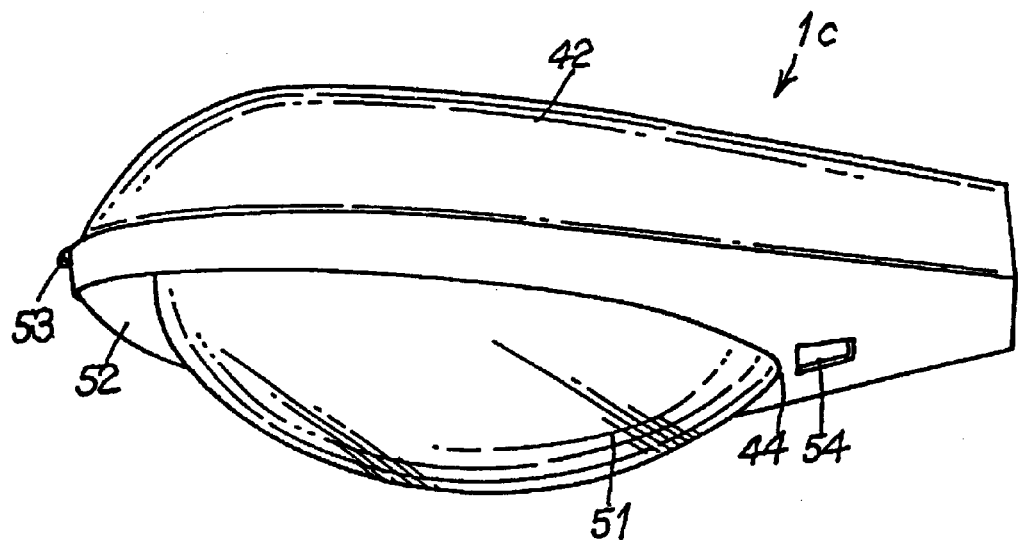
FIG. 12 is a perspective of a lighting device for a road according to the third embodiment.
Figure 13:
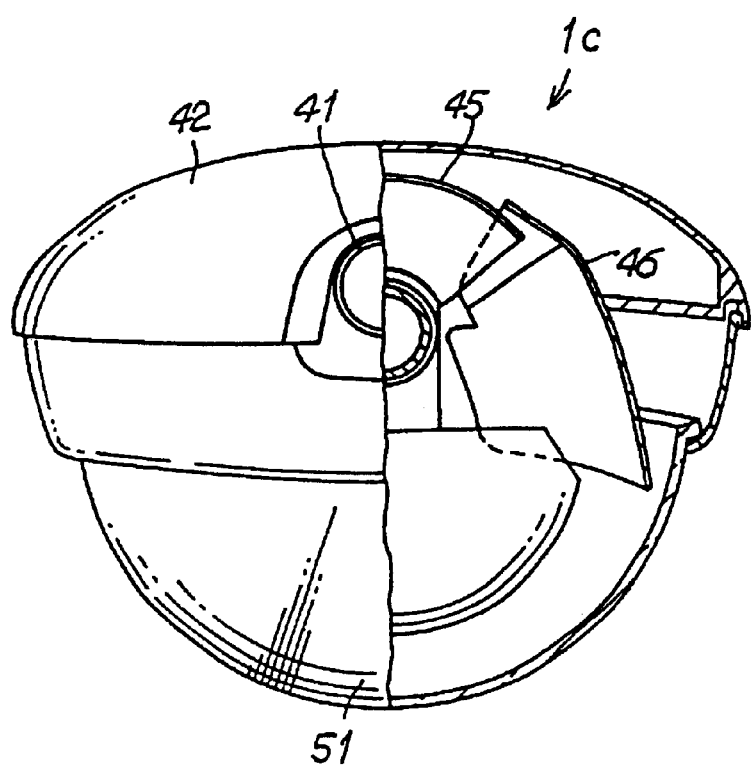
FIG. 13 is a partially cutout side view of said embodiment.
Figure 14:
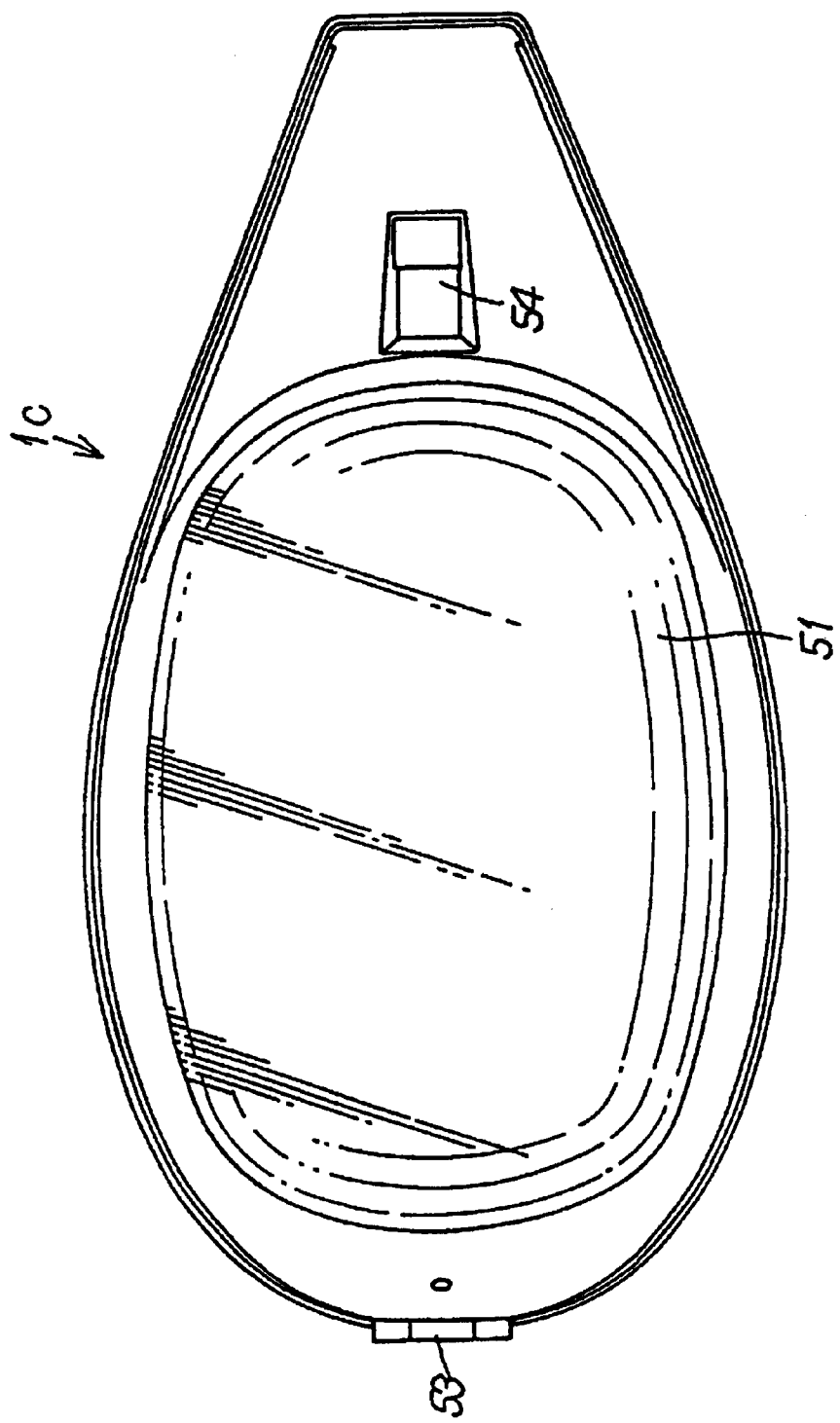
FIG. 14 is a bottom view of said embodiment.
Figure 15:
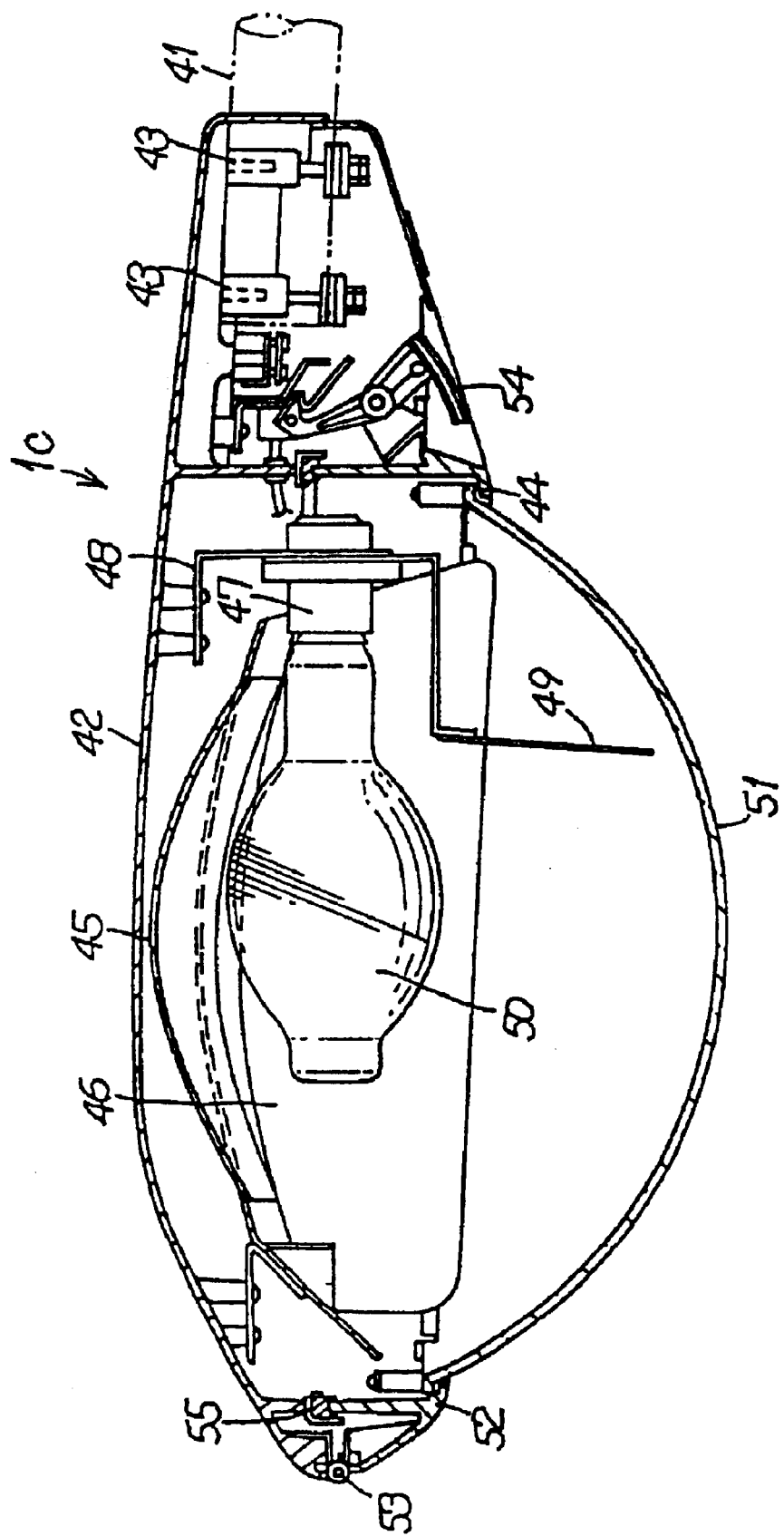
FIG. 15 is a sectional view of said embodiment.

As shown in FIG. 11, each fluorescent lamp 26 is adapted to radiate visible rays and ultraviolet rays in the wavelength range of 300 nm to 400 nm, the peak wavelength for visible rays being within the range of 500 nm to 600 nm, more specifically at approximately 550 nm. Although ultraviolet rays having wavelengths of not more than 395 nm are too low in terms of specific energy to be represented on the graph in FIG. 11, they are output at 0.05 W per 1000 lm in cases where three band fluorescent lamps are used. A lamp having an FL of 40 W, for example, has an output capacity of 3500 lm so that 0.11 W of ultraviolet rays should be output. In case of a white fluorescent lamp using a calcium halophosphate phosphor or the like, its output capacity is 0.103 W per 1000 lm. Therefore, a lamp having an FL of 40 W has a capacity of 3000 lm so that the output of ultraviolet will amount to 0.31 W. In cases where the photocatalytic function is not active due to an insufficient quantity of ultraviolet rays, a desired quantity of ultraviolet rays can be obtained by mixing an appropriate quantity of a phosphor that emits ultraviolet rays.

Each fluorescent lamp 26 seals therein mercury and inert rare gas, such as argon gas, and includes a fluorescent layer (not shown) formed inside the lamp. The fluorescent layer consists of a three band phosphor to be excited by ultraviolet rays emitted by the mercury so as to convert the ultraviolet rays to visible rays.

The aforementioned three band phosphor may comprise $Y_2O_3$:$Eu^{3+}$ as a red phosphor having a peak wavelength around 610 nm, (La, Ce, Tb)$PO_4$ as a green phosphor having a peak wavelength around 540 nm, and $BaMg_2Al_{16}O_{27}$:$Eu^{2+}$ as a blue phosphor having a peak wavelength around 450 nm.

The fluorescent layer may be formed of a mixture of phosphors in the wavelength range from 300 nm to 410 nm. The ultraviolet emitting phosphor contains at least one selected from the group consisting of an europium-activated alkali earth metal borate, a lead-activated alkali earth metal silicate, an europium-activated alkali earth metal phosphate, a cerium-activated rare earth phosphate, and a phosphor produced by adding a halogen to an europium-activated alkali earth metal borate with a weight mixing ratio of 1 to 10%. Appropriate examples of the above compounds include $SrB_2O_4$:$Eu^{2+}$ having a peak wavelength at 368 nm as an europium-activated alkali earth metal borate, (Ba, Sr, Mg)$_3$Si$_2$O$_7$:$Pb^{2+}$ having a peak wavelength at 370 nm or $BaSi_2O_5$:$Pb^{2+}$ having a peak wavelength at 350 nm as a lead-activated alkali earth metal silicate, (Sr Mg)$_2$P$_2$O$_7$:$Eu^{2+}$ having a peak wavelength in the range from 380 nm to 395 nm as an europium-activated alkali earth metal phosphate, and $YPO_4$:$Ce^{3+}$ having a peak wavelength around 357 nm as a cerium-activated rare earth phosphate.

The fluorescent lamps 26 are not limited to three band lamps; the same effect can be achieved by using a calcium halophosphate phosphor or other phosphors, and the same effect can also be achieved by using a lamp of another type, such as a circular or a compact type, instead of a straight-tube lamp.

A translucent cover 27 formed of a plate-shaped tempered glass serving as a base member and adapted to transmit visible rays and at least 80% of the entire or a part of the ultraviolet rays in the wavelength range from 300 nm to 400 nm is supported by a frame 28 and attached to the opening 22 in such a manner as to be opened or closed on hinges 29 that are provided at a side of the opening 22. Latches 30 provided at the other side of the opening 22 secure the frame 28 in the main body in such a state that the translucent cover 27 and the frame 28 close the opening 22.

In the same manner as the first embodiment shown in FIG. 4, an intermediate layer and a photocatalytic layer are formed on the outer surface of the translucent cover 27. As the photocatalytic film is so formed as to have a peak wavelength for transmission of visible rays nearly identical to the peak wavelength for visible rays radiated from the fluorescent lamps 26, the peak wavelength for visible rays radiated from the fluorescent lamps 26 effectively pass through the photocatalytic film, thereby ensuring sufficient illuminance. As is true in the first embodiment, intermediate layers and photocatalytic layers may be formed on both the outer surface and inner surface of the translucent cover 27 as shown in FIG. 7.

The second embodiment explained above conducts the same function and achieves the same effects as those of the first embodiment by use of sunlight or lighting the fluorescent lamps 26. In addition, as the fluorescent lamps 26 for emitting visible rays and ultraviolet rays in three bands are used in the second embodiment, a superior color rendering effect can be achieved.

Furthermore, the same effect can be achieved by using a circular lamp or a lamp of a compact type instead of a straight-tube type lamp. In order to facilitate the maintenance of the lighting device, a photocatalytic layer may be formed around the main body 21 in the same manner as described in the above explanation of the first embodiment.

Next, the third embodiment of the invention is explained hereunder, referring to FIGS. 12 through 16.

Referring to FIGS. 12 through 16, poles 41 having lighting devices 1c attached to the ends thereof may be arranged along a highway or a road or installed at a rest area or a parking area. Each lighting device 1c includes a main body 42 having an elliptic shape when viewed from the top. A pole support portion 43 for attaching the lighting device 1c to a pole 41 is formed at the base end of the main body 42. An opening 44 opened downward is formed at the front side of at the main body 42. A plurality of reflectors 45,46 are attached to the inner surface of the main body 42, at positions facing the opening 44 in order to reflect radiated light towards the opening 44. A lamp socket 47 is attached to the base ends of the reflectors 45,46 with a lamp socket mounting plate 48 therebetween, and another reflector 49 is attached to the lamp socket mounting plate 48 in order to reflect light radiated in the direction of the base end.

Figure 16:
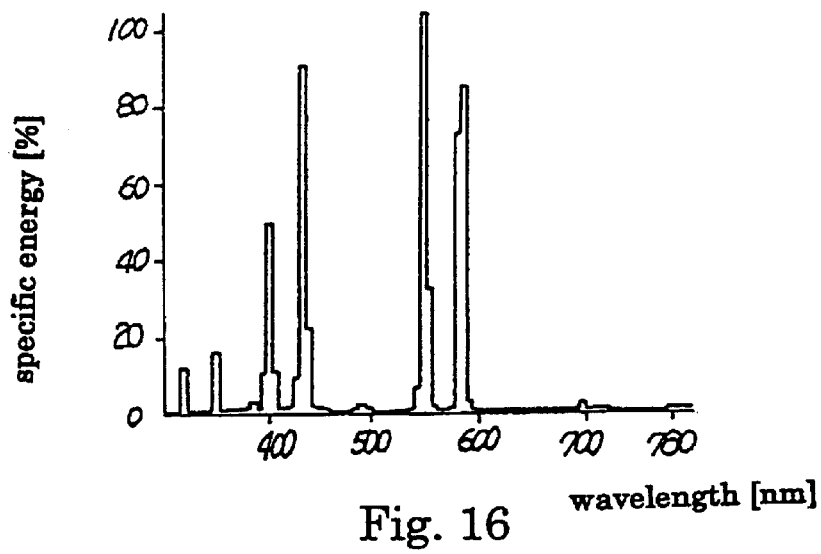
FIG. 16 is a characteristic diagram showing the emission spectrum distribution of a high pressure mercury lamp according to said embodiment.

A high pressure mercury lamp 50 which is an HID lamp serving as a light source is removably installed in the lamp socket 47. As shown in FIG. 16, the high pressure mercury lamp 50 is adapted to radiate light including visible rays and ultraviolet rays with their peak wavelengths in the range from 300 nm to 400 nm, e.g. at 330 nm and 345 nm, and the peak wavelength for visible rays within the range from 500 nm to 600 nm, more specifically at approximately 560 nm. The high pressure mercury lamp 50 is adapted to radiate light within the range from 300 nm to 410 nm at an intensity of 0.05 W per 1000 lm of visible rays.

A translucent cover 51 which is a semi-spherical glass globe serving as a base member is supported by a frame 52 and attached to the opening 44 in such a manner as to be opened or closed on hinges 53 provided at the front end of the opening 44 on the main body 42. Latches 54 provided at the base end of the opening 44 of the main body 42 secure the frame 52 in the main body 42 in such a state that the translucent cover 51 and the frame 52 close the opening 44. The main body 42 is also provided with a packing 55 for sealing the main body in a fluid-tight state with the frame 52 closing the main body 42.

In the same manner as the first embodiment shown in FIG. 4, an intermediate layer and a photocatalytic layer arranged one on top of the other are formed on the outer surface of the translucent cover 51. As the photocatalytic film is so formed as to have a peak wavelength for transmission of visible rays nearly identical to the peak wavelength for visible rays radiated from the high pressure mercury lamp 50, the peak wavelength for visible rays radiated from the high pressure mercury lamp 50 effectively pass through the photocatalytic film, thereby ensuring sufficient illuminance. As is true in the first embodiment, intermediate layers and photocatalytic layers may be formed on both the outer surface and inner surface of the translucent cover 51 as shown in FIG. 7.

The third embodiment explained above, too, conducts the same function and achieves the same effects as those of the first embodiment by use of sunlight or lighting the high pressure mercury lamp 50.

Furthermore, a photocatalytic layer may also be formed on a painted surface and/or a metal surface of the pole 41 and the main body 42 in order to achieve the self-cleaning effect. If a lighting device is used outdoors, the self-cleaning capability has a special benefit in that substances produced by decomposition of contaminants may be washed out by rain.

In cases where a lighting device defined in any one of the embodiments described above is provided with photocatalytic films on both the inner surface and outer surface of the translucent cover as shown in FIG. 7 and installed indoors or in a tunnel where it will not be exposed to sunlight, it is necessary to make the photocatalytic film on the inner surface of the translucent cover thin while making the photocatalytic film on the outer surface thick in order to prevent the source light from the fluorescent lamp from being absorbed inside the device. On the other hand, in cases where a lighting device has a structure or is in a situation such that the lighting device is exposed to sunlight radiated from the direction of the outer surface of the translucent cover, it is necessary to make the photocatalytic film on the inner surface of the translucent cover thicker while making the photocatalytic film on the outer surface thin so that a sufficient photocatalytic effect may be achieved by use of sunlight that has a sufficiently great energy, even though the photocatalytic film on the outer surface of the translucent cover is thin. This configuration has other benefits in that a superior light transmittance can be achieved because of sunlight absorbed at the outer surface of the translucent cover being minimal and that the sufficiently thick photocatalytic film on the inner surface of the translucent cover ensures a sufficient photocatalytic effect even if a part of the sunlight is absorbed by the translucent cover and the photocatalytic film on the outer surface of the translucent cover.

In other words, by providing the inner surface and the outer surface of the translucent cover with photocatalytic films having different thicknesses depending on the structure or the installation site of the lighting device, the optimum photocatalytic function at the inner and outer surfaces of the translucent cover, as well as the optimum illumination efficiency, can be achieved.

Although it is necessary to have light in the wavelength range of 300 to 410 nm reach the photocatalytic film on the outer surface of the translucent cover, this requirement can be satisfied by adjusting the irradiance of the lighting device such that a majority of light in the wavelength range of 300 to 410 nm can be transmitted without being absorbed by the photocatalytic film formed on the inner surface of the translucent cover. The irradiance can be adjusted by various means, such as selecting the light source or setting the distance between the light source and the translucent cover.

Figure 17:
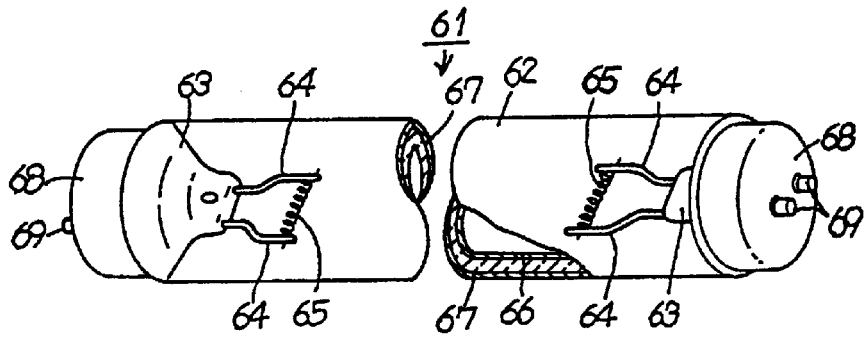
FIG. 17 is a partially cutout perspective of a fluorescent lamp which is the light source of the fourth embodiment.

Next, the fourth embodiment of the invention is explained hereunder, referring to FIG. 17.

As shown in FIG. 17, a fluorescent lamp 61 serving as a light source is a low pressure mercury vapor-filled discharge lamp having a rated power of 37 W, which is given the JIS Standard designation FL40SS, and has a hermetic container made of a translucent airtight material, i.e. a glass bulb 62 made of soda-lime glass. The glass bulb 62 has an outside diameter of 28 mm and an axial length of approximately 1198 mm and is adapted to transmit ultraviolet rays having wavelengths of not less than 300 nm. Both ends of the glass bulb 61 are sealed with stems 63,63. Lead wires 64 are hermetically introduced in the glass bulb 61 through each stem 63. A filament electrode 65 formed by winding a tungsten wire or the like into a double or triple coil is attached to the inner ends of the lead wires 64 associated with each stem. An emitter (not shown) is attached to each filament electrode 65.

The inner face of the glass bulb 62 is coated with a fluorescent layer 66 which may be principally comprised of a three band phosphor and contain, if it is necessary, a phosphor adapted to emit light having a peak wavelength ranging from 300 nm to 410 nm. A protective coat made of alumina or other appropriate material may be formed on the inner face of the glass bulb 62 so that the fluorescent layer 66 is formed over the protective coat.

Attached to each end of the glass bulb 62 is a cap 68, which is provided with cap pins 69 electrically connected to the respective lead wires 64.

In case of this embodiment, too, the three band phosphor may comprise the materials mentioned above: for example, $Y_2O_3:Eu^{3+}$ as a red phosphor having a peak wavelength around 610 nm, $(La, Ce, Tb)PO_4$ as a green phosphor having a peak wavelength around 540 nm, $BaMg_2Al_{16}O_{27}:Eu^{2+}$ as a blue phosphor having a peak wavelength around 450 nm, and, as the ultraviolet-emitting phosphor, at least one selected from the group consisting of an europium-activated alkali metal borate, a lead-activated alkali metal silicate, an europium-activated alkali earth metal phosphate, and a phosphor produced by adding a halogen to an europium-activated alkali earth metal borate. Appropriate examples of the above compounds include $SrB_4O_7:Eu^{2+}$ having a peak wavelength at 368 nm as an europium-activated alkali earth metal borate, $(Ba, Sr, Mg)_3Si_2O_7:Pb^{2+}$ having a peak wavelength at 370 nm or $BaSi_2O_5:Pb^{2+}$ having a peak wavelength at 350 nm as a lead-activated alkali earth metal silicate, and those having peak wavelengths in the range from 358 nm to 360 nm as an europium-activated alkali earth metal aluminate. $SrB_4O_7:Eu^{2+}$ is used as the ultraviolet-emitting phosphor with a mixing ratio of 1 to 10% of the mass of the fluorescent layer 66.

The glass bulb 62 is filled with given quantities of mercury and inert gas, such as argon.

In any one of the embodiments described above, the photocatalytic film may be formed of any material as long as it is capable of transmitting visible rays. However, titania ($TiO_2$) is desirable as the main component of the film. There are various methods applicable to form the photocatalytic film, such as the sol-gel method, the CVD method and the vapor deposition method. In case of the embodiments explained above, however, the process for forming a photocatalytic film calls for coating a surface targeted for the formation of a film with titania alkoxide by using the dip coating method, drying and then baking the material at a temperature in the range from approximately 650° C. to 800° C. for about 30 seconds to 5 minutes so as to make the film having a thickness in the range of approximately $0.01\mu$ to $0.1\mu$. When forming photocatalytic films on both sides of the base member, the film thicknesses on both sides can easily be made uniform by using the dip coating method. Furthermore, a desired titanium oxide may be produced through hydrolysis of titanium alkoxide generated from a reaction in the presence or without the presence of a noble metal. By using a titanium oxide produced as above, it is possible to form a film which is highly translucent as well as thin and dense.

With regard to the crystal characteristics of titanium alkoxide of a photocatalytic film, anatase-type crystallization becomes conspicuous when the baking temperature is in the range from 650° C. to 800° C., whereas the film is formed as a mixture of amorphous substances and anatase-type crystals when baked at approximately 400° C. In cases where a photocatalytic film is baked at a temperature of approximately 900° C., spherical crystal particles grow, thereby making the titanium oxide of the film a mixture of the rutile type and the anatase type. The methods of forming a photocatalytic film are not limited to these processes; it may be formed by any other appropriate process.

Figure 18:
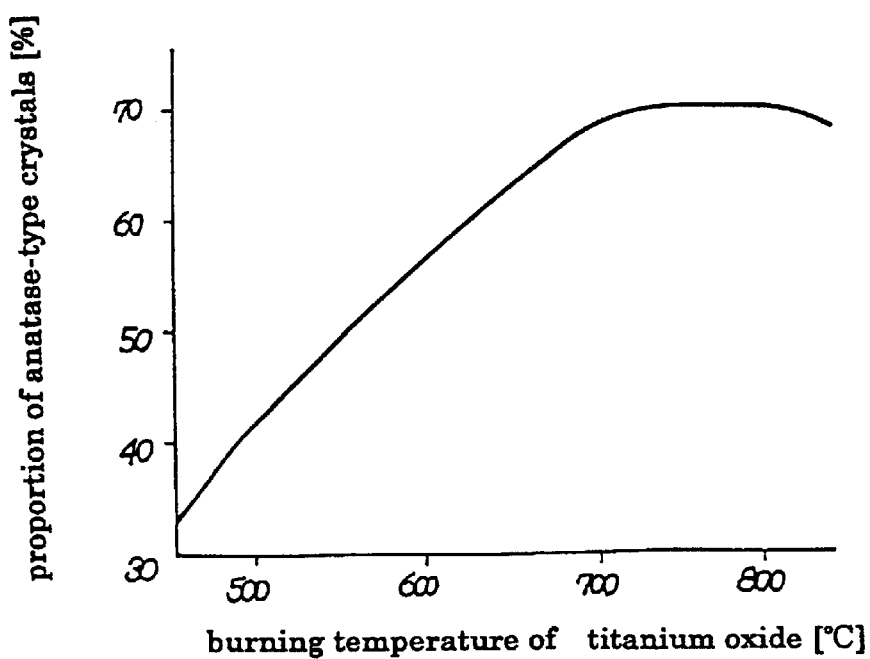
FIG. 18 is a graph showing a relationship between baking temperatures and component ratios of the anatase type crystal in cases where the photocatalytic film is made of titanium oxide.

When forming a photocatalytic film by using titanium alkoxide, a large part of the film is still in a glassy state at 400° C., because the temperature is too low for crystallization to sufficiently progress. As the baking temperature is increased, crystallization advances further. As shown in FIG. 18, the proportion of anatase-type crystals reaches its maximum when the temperature is in the range from 650° C. to 800° C. When the baking temperature exceeds 800° C., the crystal structure is transformed into the rutile type structure. As the crystal grain boundary grows, light tends to scatter, resulting in decreases in transmittance of visible rays as well as photocatalytic capability.

Photocatalytic films having nearly identical thicknesses are respectively formed on both sides of the base member, i. e. the translucent cover, by preparing a titanium alcoholate solution by dissolving the photocatalytic material principally comprised of an organic titanium compound in a solvent, such as alcohol, conducting a dip coating operation which comprises dipping the translucent cover in the titanium alcoholate solution and lifting the translucent cover at a constant speed, and then baking the translucent cover at approximately 800° C. As photocatalytic films produced by following the above procedure have a superior transmittance of visible rays, they are free from the danger of reducing irradiation of visible rays. In other words, as the increase in anatase-type titanium oxide lowers the refraction index, the loss of the light necessary for the photocatalytic activity is reduced. Therefore, together with the benefit of the increase in the absorption of ultraviolet light that is necessary for the photocatalytic activity, the photocatalytic function becomes more effective. The transmittance of visible rays or the photocatalytic activity may be enhanced as needed by adjusting the proportion of anatase-type crystals and conducting the baking process at the most appropriate temperature.

The term "contains as the principal component an anatase-type titanium oxide" mentioned above means that anatase-type titanium oxide occupies not less than 50% by weight of all the components of a photocatalytic film in terms of a relative proportion obtained by computing values measured according to an X-ray analysis method. Although there are compounds other than titanium oxide that are known to have the photocatalytic function, an anatase-type titanium oxide is preferable because of its photocatalytic effectiveness and its characteristic of ensuring formation of a colorless, transparent film. Examples of the auxiliary components include various photocatalytic materials other than anatase-type titanium oxide, such as $TiO_2$, ZnO, $WO_3$, $LaRhO_3$, $Fe_2O_3$, $FeTiO_3$, $SrTiO_3$, $CeO_2$, $Tb_2O_3$, MgO, $Er_2O_3$, $CdFe_2O_4$, CdSe, GaAs, CaP and $TbO_2$, any one of which may be of rutile type or in an amorphous state, various noble metals which are capable of enhancing the photocatalytic function, such as Pt, Ag, Pd, their compounds or powder, and zeolite. Furthermore, the same effect can be achieved by dispersing, as the binding component, fine particles of $TiO_2$ having an average diameter of less than 1 $\mu$m, desirably in the range of 0.05 $\mu$m to 0.2 $\mu$m, on both sides of the translucent cover that serves as the base member.

Although every embodiment described above uses interference films for their photocatalytic films, a photocatalytic film so formed as to prevent generation of interference between visible rays may be used in any one of the embodiments. A test for observing the spectrum of a photocatalytic film of an example of such a configuration, wherein the photocatalytic film is so formed as to obtain a satisfactory transmittance.

Figure 19:
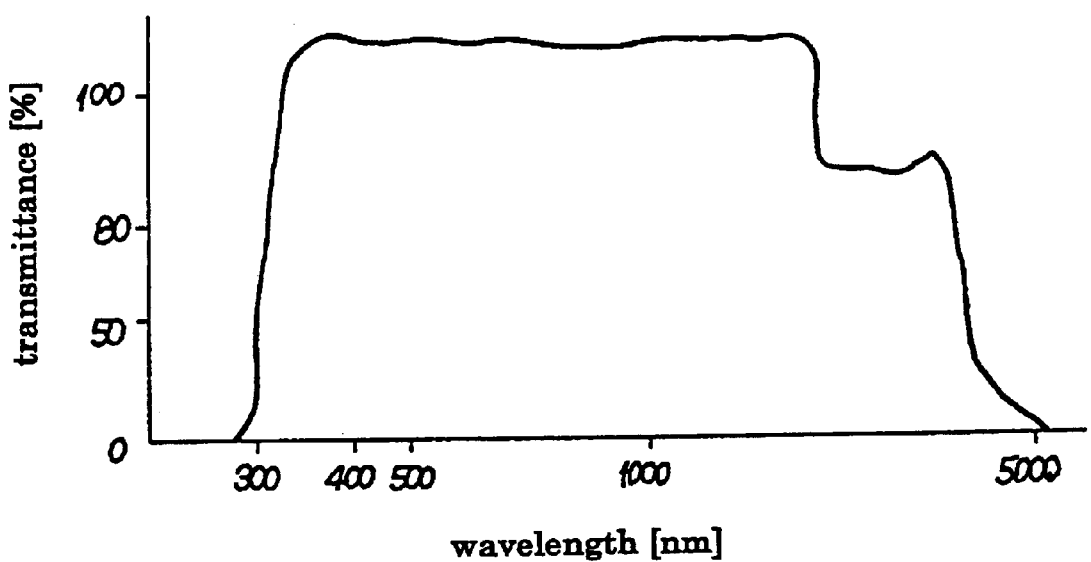
FIG. 19 is a graph showing the spectral transmittance of the translucent cover.

First, a photocatalytic film having a thickness within such a range as to not generate interference between visible rays is formed based on the refractive indexes of the components of the photocatalytic film. Each actual photocatalytic sample for this test was formed by baking a photocatalytic film on a side of a plate-shaped base material made of an approximately 4 mm thick soda-lime glass at a temperature between 650° C. and 800° C., the photocatalytic film having a thickness between 0.05 $\mu$m and 0.07 $\mu$m and comprised of a titanium oxide film obtained from titanium alkoxide. As shown in FIG. 19, the soda-lime glass has a transmittance factor not less than 80% for at least a part of light in the wavelength range from 300 nm to 410 nm, more specifically not less than 350 nm.

Next, the light of a deuterium lamp and a halogen lamp was radiated from the other side of the samples of photocatalytic material. At that time, the 365 nm light that had passed through the photocatalytic film had an intensity of 0.01 mW/cm². Further, it has been confirmed from results of other tests that a photocatalytic film effectively prevents dirtying, provided the intensity of the light having a wavelength of not more than 410 nm is not less than 0.01 mW/cm² when it reaches the photocatalytic film from the other side of the sample.

Wavelengths of rays transmitted through a sample and a glass member which is formed of the same type of glass but is not provided with a photocatalytic film were measured by a spectrometer (UV2400PC manufactured by Shimazu Seisakusho) in order to determine the transmittance of each wavelength based on the spectrum of the light before passing through the sample being benchmarked as 100%.

Figure 20:
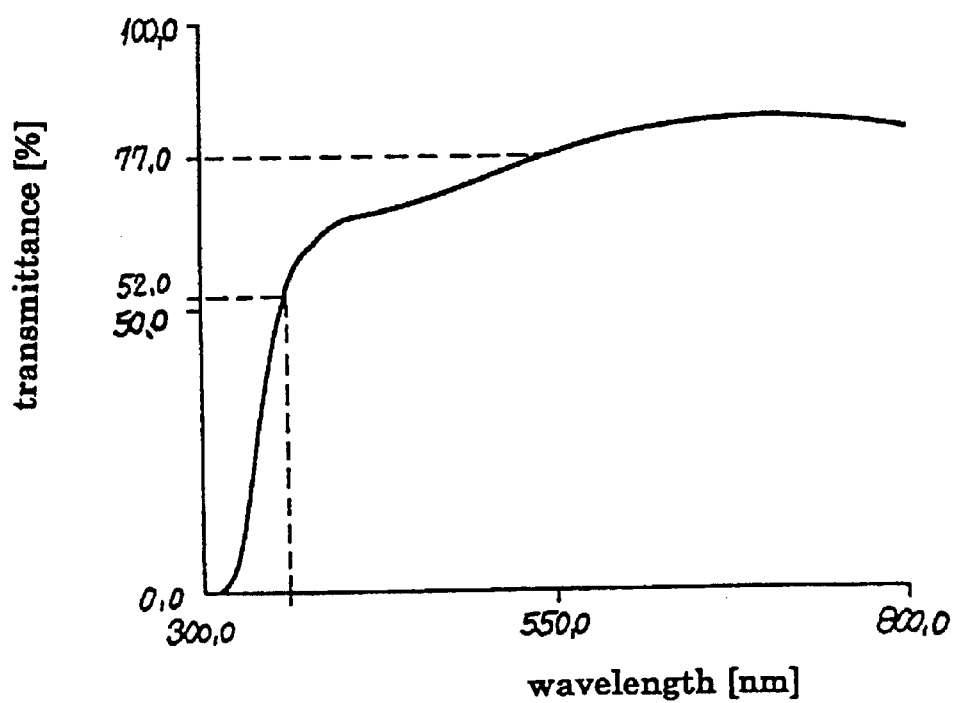
FIG. 20 is a graph showing the spectra of a sample produced by forming a photocatalytic film on a glass base.
Figure 21:
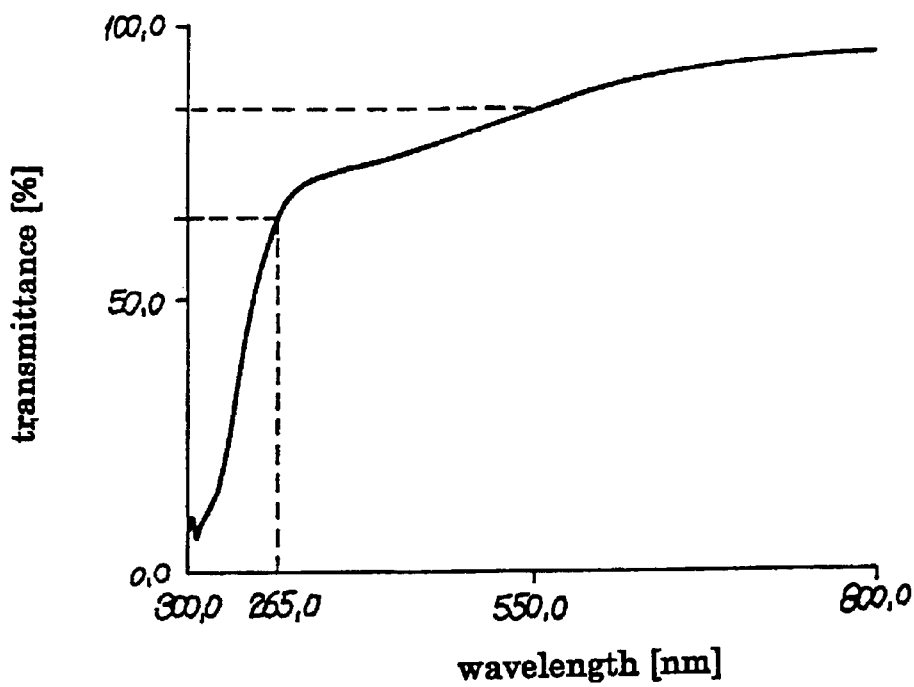
FIG. 21 is a graph showing the spectra of the photocatalytic film itself.
Figure 22:
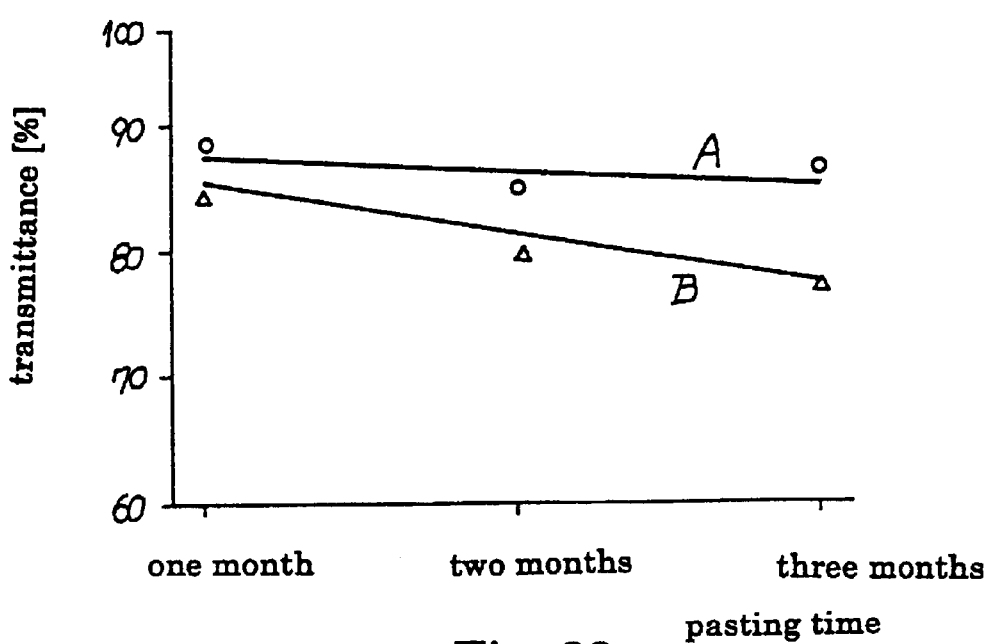
FIG. 22 is a graph showing transmittance of visible light over passage of time.

FIG. 20 is a graph showing the spectra for the sample produced by forming a photocatalytic film on a glass base material, and FIG. 21 is a graph showing the spectra of the photocatalytic film itself, which has been computed by deducting the spectra for the glass material alone from the spectra for the sample with the photocatalytic film.

As shown in FIGS. 20 and 21, as virtually no interference peak was detected in the range of visible light, it was confirmed that interference generated by the photocatalytic film was limited to a minimum. In addition, FIG. 21 indicates that the photocatalytic film itself presented an 85% transmittance of visible light having a wavelength of 550 nm and a 62% transmittance of ultraviolet rays. In other words, it has been confirmed that sufficient photocatalytic activity and a high visible light transmittance are ensured if the performance of a photocatalytic film is in the above range. To be more specific, it should be sufficient if a photocatalytic film alone, i. e. a film without a base member, has a visible light transmittance of not less than 83% and ultraviolet transmittance of not more than 68%.

In the above embodiment, a photocatalytic film formed on at least a part of a base member had a thickness ranging from 0.01 μm to 0.3 μm, because a photocatalytic film less than 0.01 μm in thickness not only drastically reduces the light absorption capability of the film but is also difficult to be made uniform, resulting in decrease in the photocatalytic activity, while a photocatalytic film more than 0.3 μm in thickness is more prone to the problem of rainbow interference colors caused by interference between visible light. In order to restrain the light interference further, it is desirable to form a photocatalytic film having a thickness of not more than 0.1 μm. In cases where the principal component of a photocatalytic film is titanium oxide, such a thickness as to prevent interference between visible rays when the refractive index is 2.0 ranges from 0.01 μm to 0.1 μm. Therefore, it is desirable that a baking process be conducted at a temperature most appropriate to attain a thickness which is within said range and will attain a high transmittance of visible light or highly active photocatalytic performance. Interference between light can also be restrained by adjusting the refraction index of the photocatalytic film. For example, although a base member made of glass is prone to interference between light due to its refraction index that is lower than that of a photocatalytic film principally comprised of $TiO_2$, the refraction index of the photocatalytic film can be reduced by mixing in a material having a lower refraction index, such as $SiO_2$, thereby restraining interference between light.

As described above, it has been confirmed that a photocatalytic film shown in FIGS. 20 and 21, which is so formed as to prevent interference between visible light, ensures that light which has passed through the photocatalytic film is colorless and transparent, being practically free from the problem of rainbow-color light interference, even when the light of a fluorescent lamp is radiated from the back side.

In order to prevent the lighting device from becoming dirty, it is desirable to use a light source that emits light rays of which a large part have wavelengths of not more than 410 nm. However, when radiant flux of light is increased, luminous flux of visible rays decreases, impairing the illumination efficiency. When a lighting device is actually used, how fast the lighting device becomes dirty depends on conditions of contaminants, and the irradiant required for decomposition of contaminants vary accordingly.

In the above description, the radiant flux in the wavelength range from 300 nm to 410 nm is set at not less than 0.05 W per 1000 lm of visible light, because a light source having a higher contaminant decomposition capability is selected based on the result of a test conducted on various light sources to determine their effectiveness in decomposition of pollutants from exhaust gas. The test was conducted by changing envelopes made of glass or plastic without reducing the intensity or radiant flux of the light sources. Further, light in the wavelength range from 300 nm to 410 nm contains what is generally called near ultraviolet rays and a part of visible light, wherein "visible light" means light rays having wavelengths ranging from 380 nm to 780 nm.

Results of the test are shown in Table 1. The radiant fluxes (W) shown in the table were determined by measuring the rays having wavelengths between 300 nm 410 nm per 1000 lm.

TABLE 1

| LIGHT SOURCE | RADIANT FLUX | EFFECT |
|---|---|---|
| Fluorescent lamp (calcium halo-phosphor) | 0.6–0.8 W/1000 lm | great |
| Fluorescent lamp (3-band phosphor) | 0.4–0.5 W/1000 lm | great |
| Fluorescent lamp (plastic globe) | 0.035 W/1000 lm | small |
| High pressure mercury lamp | 3–5 W/1000 lm | great |
| Metal halide lamp | 2–3 W/1000 lm | great |
| High pressure sodium lamp | 0.1–0.2 W/1000 lm | great |
| High pressure sodium lamp | less than 0.1 W/1000 lm | small |

It is evident from the result shown in Table 1 that radiant flux of not less than 0.05 W per 1000 lm is sufficient to decompose grime on glass resulting from exhaust gas from vehicles while maintaining the illuminating effectiveness.

In cases where rays transmitted through the photocatalytic film have wavelengths of not more than 410 nm have an intensity of not less than 0.01 mW/cm², they sufficiently activate the photocatalytic film so that the photocatalytic film performs a desired function of decomposing contaminants. Should oil mist and other fats or oils, as well as carbon, dirt and other debris, accumulate on the photocatalytic film, such organic substances are effectively prevented from adhering to the film. Furthermore, if moisture, substances given off by internal parts, or substances easy to be adsorbed, such as nicotine or tar, are adsorbed by the inner surface, they are effectively decomposed within several hours after the fluorescent lamp is lighted.

Time-wise comparison of a lighting device A including a photocatalytic film with a conventional lighting device B which is not provided with a photocatalytic film indicates that the lighting device A including a photocatalytic film showed a transmittance capability of 85% or more after a lapse of three months, while the conventional lighting device B without a photocatalytic film showed a decrease to nearly 75% in transmittance.

"Light (or light rays) having wavelengths of not more than 410 nm" referred to in the above explanation may contain visible light having wavelengths exceeding 410 nm in addition to rays having wavelengths of not more than 410 nm. The visible light and light having wavelengths of not more than 410 nm may be sunlight and/or artificial light having arbitrary wavelengths. When artificial light sources are used, too, light having any desired wavelength can be obtained by various lamps. For example, of light having spectra characteristic to mercury, light having wavelengths of 185 nm or 254 nm may be generated by fluorescent lamps, bactericidal lamps, black-light lamps or the like by way of low pressure mercury discharge, and light having wavelengths of 365 nm or 410 nm may be generated by high pressure mercury lamps by way of high pressure mercury discharge. Light having other wavelengths may be generated by means of phosphors of other types. In addition, by mixing an appropriate quantity of a phosphor in an ordinary fluorescent lamp, light having its peak wavelength at any desired level below 410 nm may appropriately be emitted. Therefore, the light source to be used for the invention may be any lamp selected from among various discharge lamps including low pressure mercury discharge lamps such as fluorescent lamps, high pressure mercury lamps, high intensity discharge lamps such as high pressure sodium lamps, and incandescent lamps such as halogen lamps. In cases where a discharge lamp is used as the light source, the light emission means is mainly comprised of a combination of a discharge medium and electrodes or other similar means for causing discharge in the discharge medium, wherein the discharge medium is at least one of the materials selected from among metals, metal halides and noble gases. In case of an incandescent lamp, a light-emitting filament serves as the main component of the light emission means.

On condition that the base member is capable of transmitting at least rays of light having wavelengths of 410 nm or less, the photocatalytic function may be performed by means of a photocatalytic film formed on at least a part of the base member, wherein the photocatalytic film is free from interference between visible light, with its transmittance of visible light having a wavelength of 550 nm being at least 15% higher than the transmittance of 365 nm ultraviolet light.

Any material may be selected as the base member from among materials which have the characteristic of selectively transmitting rays of light having wavelengths of 410 nm or less and materials which, in addition to having said characteristic, are also capable of transmitting visible light. Examples of such materials include various types of glasses, such as soda-lime glass widely used for illumination, borosilicate glass, quartz glass and microcrystal glass, various inorganic materials such as translucent ceramics and translucent monocrystals, and translucent organic materials such as transparent synthetic resins. If it is necessary to prevent visible light from spilling out of the device, it is sufficient to use a material that transmits virtually no visible light as the base member. Furthermore, in case of a configuration which calls for radiating light from the back of the base member in order to activate the photocatalyst, the base material may have any desired shape and size, because there is no limitation regarding the base material as long as the light transmitted through the base material has sufficient energy to activate the photocatalyst.

As glass blocks ultraviolet rays having wavelengths of less than 254 nm to a considerable extent, a photocatalyst appropriate for a fluorescent lamp may be provided by using glass as the base member. Further, as glass is inexpensive and easy to process, using glass as the base member has the additional benefit of expanding the applicable range of the photocatalyst.

Although a photocatalytic film is formed over the entire surface of the target side of the base member in the embodiments described above, a photocatalytic film may not necessarily be formed on the entire surface; it may be provided only at a located where it is needed. For example, in order to prevent contact between a photocatalytic film and a packing that serves to attach the base member to the main body of the device in a fluid tight state, the photocatalytic film may be refrained from being formed around the portion of the base member that corresponds to the packing.

A photocatalyst on which a photocatalytic film is formed may serve as a cover glass used for a lighting fixture, a display of an office automation equipment, a show-case or the like. Even if light is radiated from the back of the base member of the photocatalyst, the light passes through the base member and activates the photocatalytic film. In addition, as the photocatalytic film does not absorb much visible light and generates virtually no interference colors, the photocatalytic film can be made highly transparent. Therefore, a photocatalyst according to the invention is applicable to various construction materials including window materials and tiles, electric appliances such as lamps and lighting fixtures, furniture, vehicles, sanitary products and so forth, performing the photocatalytic function with virtually no danger of impairing the original function of the product equipped with the photocatalyst. The photocatalytic function of the invention is most appropriate for preventing dirtying by decomposing and removing grime and contaminants that primarily consist of organic substances, such as oil film and nicotine of tobacco and is capable of maintain the base member functional and beautiful for a long period of time. Furthermore, a photocatalyst according to the invention is also effective in decomposing germs and substances, e.g. acetaldehyde, which are prone to causing bad odor.

INDUSTRIAL APPLICABILITY

As described above, the present invention is applicable to various construction materials including window materials and tiles, electric appliances such as lamps and lighting fixtures, furniture, vehicles, sanitary products and so forth.

What is claimed is:

1. A photocatalyst including:
   a base member transmitting at least rays of light having wavelengths of not more than 410 nm, and
   a photocatalytic film formed on at least a part of said base member, the photocatalytic film so formed as to not generate interference between visible light and transmitting light such that the transmittance of visible light at a wavelength of 550 nm is at least 15% higher than the transmittance of ultraviolet light having a wavelength of 365 nm.

2. A photocatalyst as claimed in claim 1, wherein the photocatalytic film without a base member has a visible light transmittance of not less than 83% and an ultraviolet transmittance of not more than 68%.

3. A photocatalyst as claimed in claim 1, wherein the photocatalytic film has a thickness ranging from 0.01 $\mu$m to 0.3 $\mu$m.

4. A photocatalyst as claimed in claim 1, wherein the photocatalytic film contains as the principal component an anatase-type titanium oxide.

5. A photocatalyst as claimed in claim 1, wherein the base member is formed of glass.

6. A photocatalyst as claimed in claim 5, wherein the glass is in the shape of plate which transmits visible light, with a photocatalytic film formed on at least one side of the glass.

7. A light source including:
   an airtight container formed of a translucent material that transmits at least rays of light having wavelengths of not more than 410 nm;
   a photocatalytic film which is so formed on at least a part of the outer surface of said airtight container as to not generate interference between visible light and transmitting light such that transmittance of the photocatalytic film of visible light at a wavelength of 550 nm is at least 15% higher than the transmittance of ultraviolet light having a wavelength of 365 nm; and
   a light emission means disposed in the airtight container.

8. A lighting device including:
   a main body which incorporates a light source and a radiation opening, said light source emitting at least rays of light having wavelengths of not more than 410 nm;
   a base member disposed at the radiation opening of the main body and transmitting visible light as well as rays of light having wavelengths of not more than 410 nm; and
   a photocatalytic film which is so formed on either a part of or the entire surface of at least a surface of the base member so as to not generate interference between visible light and transmitting light such that the transmittance of the photocatalytic film of visible light at a wavelength of 550 nm is at least 15% higher than the transmittance of ultraviolet light having a wavelength of 365 nm.

9. A lighting device as claimed in claim 8, wherein the base member is a translucent cover.

10. A lighting device as claimed in claim 8, wherein the base member is a transparent globe.

11. A lighting device including:
    a translucent cover covering a light source radiating at least visible light and rays of light in the wavelength range of 300 nm to 400 nm, and
    a photocatalytic film formed on at least one side of the translucent cover and containing as the principal component titania ($TiO_2$) of which the peak wavelength for visible light transmittance is nearly the same as the peak wavelength for visible light radiated from the light source.

12. A lighting device as claimed in claim 11, wherein the peak wavelength for visible light transmittance of the photocatalytic film ranges from 500 nm to 600 nm.

13. A lighting device as claimed in claim 11, wherein the translucent cover transmits not less than 80% of light that includes visible light and ultraviolet light in the wavelength range of 300 nm to 400 nm.

14. A lighting device as claimed in claim 11, wherein the principal component of the photocatalytic film is anatase crystal-type titania ($TiO_2$).

15. A lighting device as claimed in claim 11, wherein the photocatalytic film is formed with an intermediate layer principally comprised of silica ($SiO_2$) provided between the photocatalytic film and the translucent cover.

16. A lighting device as claimed in claim 11, wherein the photocatalytic film has a thickness ranging from 0.01 $\mu$m to 0.5 $\mu$m.

17. A lighting device as claimed in from claim 11, wherein the light source is a high pressure sodium lamp.

18. A lighting device including:
    a main body incorporating a light source emitting ultraviolet light in the wavelength range of 300 nm to 410 nm at not less than 0.05 W per 1000 lm of visible light;
    a translucent cover disposed in the main body in such a state as to cover the light source, said translucent cover having transmittance not less than 80% for at least a part of ultraviolet light in the wavelength range of 300 nm to 410 nm; and
    photocatalytic films which contain titanium oxide as the main component and formed on both sides of the translucent cover.

19. A lighting device as claimed in claim 18, wherein the titanium oxide contained in the photocatalytic films is of an anatase type, and the photocatalytic films are made nearly uniform in thickness.

20. A lighting device as claimed in claim 18, wherein ultraviolet light radiated to the inner surface of the translucent cover and having wavelengths ranging from 300 nm to 410 nm has an intensity of 0.05 mW/cm$^2$ in terms of illuminance.

* * * * *